(12) United States Patent
Ota et al.

(10) Patent No.: US 6,452,749 B1
(45) Date of Patent: Sep. 17, 2002

(54) TAPE CASSETTE

(75) Inventors: Shuichi Ota, Saitama; Sunao Kushiro, Chiba, both of (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/576,447

(22) Filed: May 22, 2000

(30) Foreign Application Priority Data

May 25, 1999 (JP) .......................................... 11-145532

(51) Int. Cl.[7] .............................................. G11B 23/02
(52) U.S. Cl. ...................................................... 360/132
(58) Field of Search ................................ 360/132, 134, 360/131; 369/272, 289, 291

(56) References Cited

U.S. PATENT DOCUMENTS

| | | | | |
|---|---|---|---|---|
| 5,065,955 A | * | 11/1991 | Fujii | 242/338 |
| 5,198,951 A | * | 3/1993 | Fujii | 360/132 |
| 5,322,237 A | * | 6/1994 | Ota et al. | 242/347.1 |
| 5,390,057 A | * | 2/1995 | Nishimura et al. | 360/96.5 |
| 5,404,261 A | * | 4/1995 | Ohira et al. | 242/347.1 |
| 5,412,525 A | * | 5/1995 | Ota et al. | 360/132 |
| 5,502,608 A | * | 3/1996 | Senshu et al. | 360/132 |
| 5,630,560 A | * | 5/1997 | Fujii et al. | 242/338 |
| 6,011,675 A | * | 1/2000 | Shima et al. | 360/132 |

* cited by examiner

*Primary Examiner*—Robert Tupper
*Assistant Examiner*—Julie Anne Watke
(74) *Attorney, Agent, or Firm*—Rader, Fishman & Grauer PLLC; Ronald P. Kananen, Esq.

(57) ABSTRACT

A tape cassette comprising tape reels around which a tape-shaped recording medium is wound, a cassette shell in which the tape reels are accommodated, a mouth portion provided at the front portion of the cassette shell so as to be opened in the forward direction and in the up-and-down direction, a part of the tape-shaped recording medium being located so as to traverse the front end of said mouth portion, a front lid located at the front side of the tape-shaped recording medium, and a back lid which is located at the back side of the tape-shaped recording medium to cover the tape-shaped recording medium and provided to the cassette shell so as to be freely movable in the forward and backward direction, the back lid being moved back to the just back side thereof when a lid-open operation is carried out to expose the tape-shaped recording medium to the outside.

6 Claims, 25 Drawing Sheets

TAPE CASSETTE

BACKGROUND OF THE INVENTION

1. Field of the Invention

The present invention relates to a tape cassette having a back lid which is freely movable forward and backward relative to a cassette shell.

2. Description of the Related Art

Followed by the high recording-density design of tape cassettes has been developed a technique in which a portion of a tape-shaped recording medium exposed from a cassette shell (hereinafter referred to as "exposed portion") is covered by a cover member called as "lid" when the tape cassette is not used, thereby preventing dusts from adhering to the exposed portion of the tape-shaped recording medium or preventing oil or the like with touch of fingers from adhering to the exposed portion of the tape-shaped recording medium.

One type of these conventional tape cassettes is designed such that the front side of the tape-shaped recording medium is covered by a front lid while the back side thereof is covered by a back lid. According to this tape cassette, when the tape cassette is used, the front lid is upwardly rotated by substantially 90 degrees, and the back lid is substantially obliquely upwardly moved by using a cam to open the lid, that is, expose the tape-shaped recording medium to the outside.

In the conventional tape cassette described above, the back lid is substantially obliquely upwardly moved by using the cam when the lid is opened. Therefore, if the tape-shaped recording medium is slacked, there would occur such a trouble that the tape-shaped recording medium is entangled in the back lid, or it is pulled out and excessively drawn out of the cassette shell by the back lid although it is not entangled in the back lid, so that it is finally enrolled in members of a recording/reproducing apparatus such as a pinch roller, a tape guide.

The applicant of this application has owned the following three U.S. patents pertaining to this application:

1. U.S. Pat. No. 5,322,237 titled "Lid ASSEMBLY FOR A TAPE CASSETTE WHICH PROTECTS FRONT AND REAR SURFACES OF A MAGNETIC TAPE";

2. U.S. Pat. No. 5,412,525 titled "TAPE CASSETTE HAVING A ROCKABLE FINGER FOR LATCHING A SLIDABLE SHUTTER"; AND 3. U.S. Pat. No. 5,502,608 titled "TAPE CASSETTE HAVING A CASE WITH A MOUTH FOR MAGNETIC HEAD DRUM OF A RECORDING/REPRODUCING APPARATUS".

SUMMARY OF THE INVENTION

Therefore, an object of the present invention is to provide a tape cassette in which a tape-shaped recording medium can be prevented from being entangled in a back lid when the lid is opened.

In order to attain the above object, according to the present invention, there is provided a tape cassette in which a back lid is provided so as to be freely movable forward and backward relatively to a cassette shell, and the back lid is moved just back when the lid is opened to expose the tape-shaped recording medium to the outside.

Accordingly, in the tape cassette according to the present invention, the back lid is moved back from the tape-shaped recording medium at a stretch, so that the tape-shaped recording medium can be prevented from being entangled by the back lid when the lid is opened.

BRIEF DESCRIPTION OF THE DRAWINGS

FIGS. 9A and 9B are enlarged cross-sectional views taken along IX—IX line of FIG. 8, wherein FIG. 9A shows the left end portion and FIG. 9B shows the right end portion;

FIGS. 10A and 10B are enlarged cross-sectional views taken along x—x line of FIG. 8, wherein FIG. 10A shows the left end portion and FIG. 10B shows the right end portion;

FIGS. 11A and 11B are enlarged cross-sectional views taken along XI—XI line of FIG. 8, wherein FIG. 11A shows the left end portion and FIG. 11B shows the right end portion;

FIGS. 20A and 20B are enlarged sectional views along XX—XX line of FIG. 19, wherein FIG. 20A shows the left end portion and FIG. 20B shows the right end portion;

FIGS. 21A and 21B are diagrams showing a modification of the structure for implementing a sequential operation of rotating the front lid and then moving it backward, wherein FIG. 21A shows a lid-closed state and FIG. 21B shows a backward-movement;

BRIEF DESCRIPTION OF THE PREFERRED EMBODIMENTS

Figure 1:
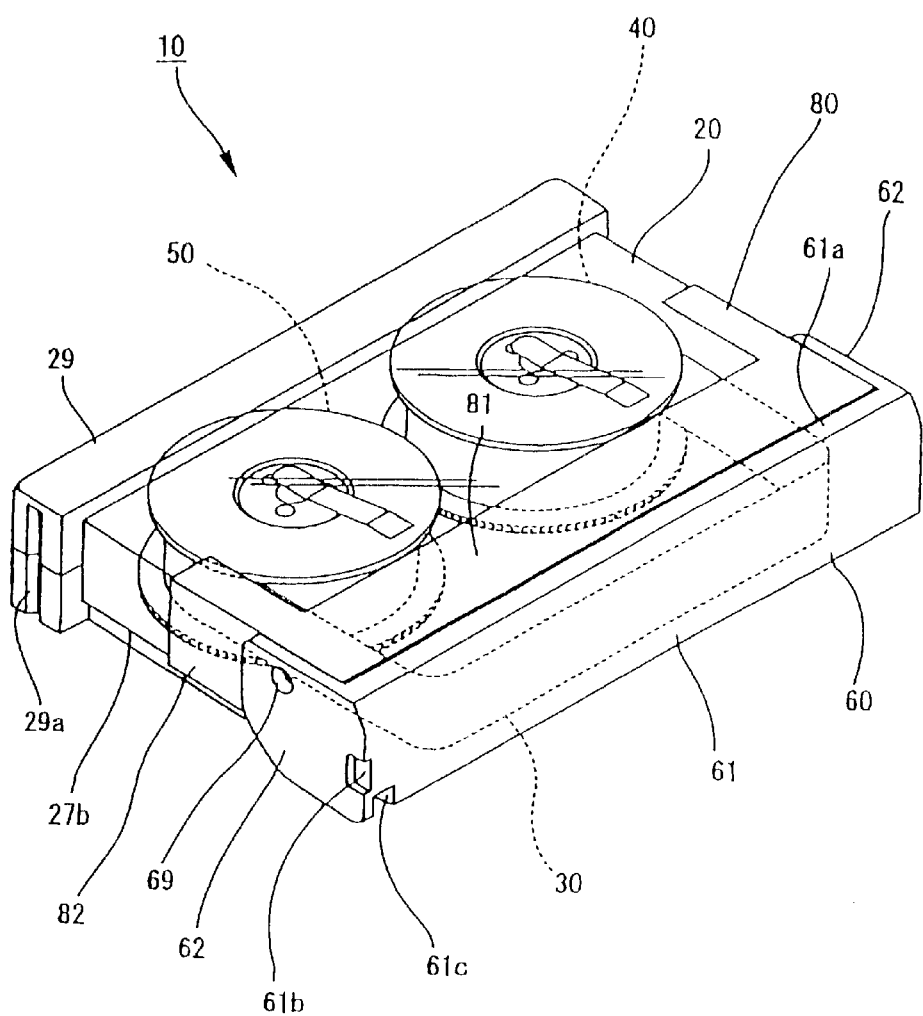
FIG. 1 is a perspective view showing an embodiment of a tape cassette according to the present invention when a front lid is located at a closed position.
Figure 2:
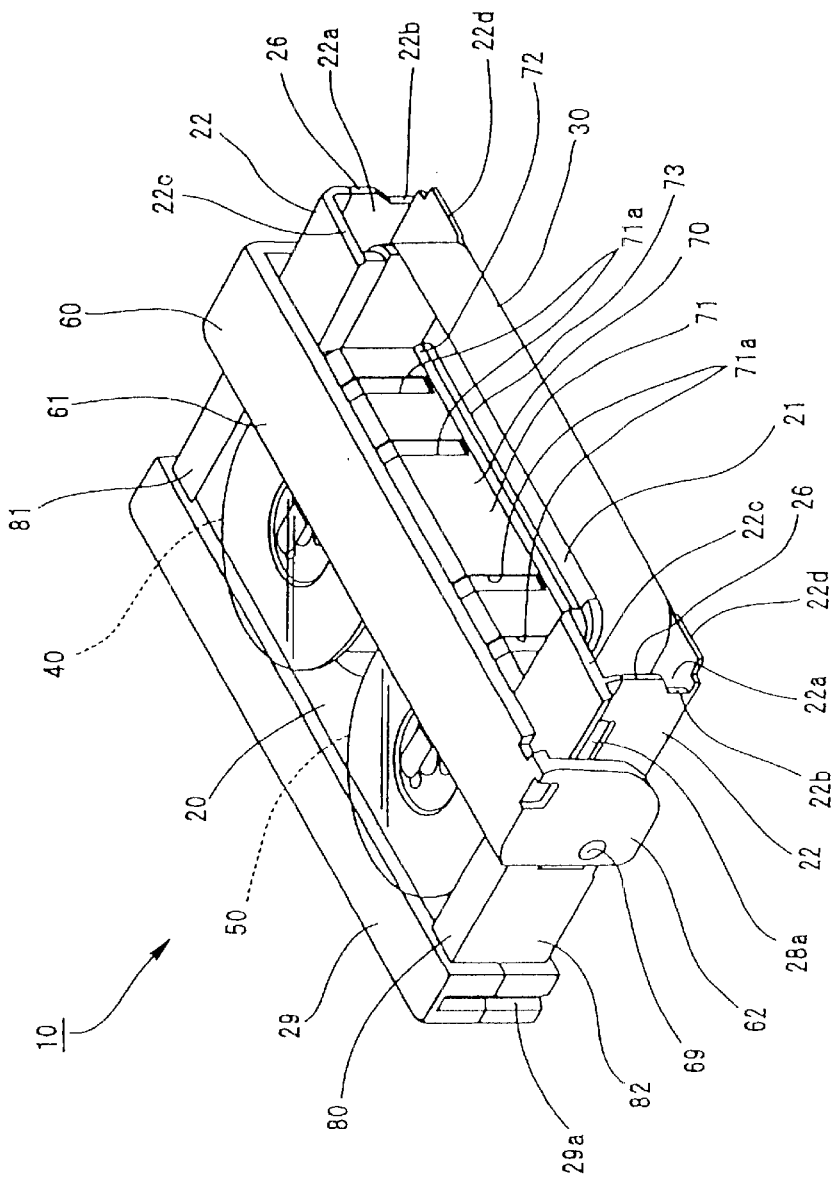
FIG. 2 is a perspective view showing a state where both of the front lid and a back lid are located at an open position.

Preferred embodiments according to the present invention will be described with reference to the accompanying drawings.

In a cassette tape 10 of this embodiment, a magnetic tape 30 which is a tape-shaped recording medium is wound around tape reels 40, 50, and these tape reels 40, 50 are rotatably accommodated in a cassette shell 20 having a thin box shape. The cassette tape 10 has a front lid 60 which covers the front surface side of the magnetic tape 30 located along the front face of the cassette shell 20, and a back lid 70 which covers the back side of the magnetic tape 30. The back lid 70 is formed integrally with a slider 80 which is supported the cassette shell 20 so as to be freely movable in forward and backward directions, and the front lid 60 is freely rotatably supported on the slider 80.

The cassette shell 20 is designed in a thin box shape, and formed of plastic. The overall body of the cassette shell 20 or a part of the cassette shell 20 which faces the tape reels 40, 50 is designed to be transparent so that the tape reels 40, 50 can be viewed from the upper side of the cassette shell 20.

A large recess portion 21 called as "mouth portion" is formed at the front portion of the cassette shell 20. The mouth portion 21 is opened in the forward direction and in the up-and-down direction.

Recess stripes 21a extending in the up-and-down direction are formed on the back face of the mouth portion 21 so as to avoid the positions facing the maximum outer diameter portions of the tape reels 40, 50 disposed in the cassette shell 20.

The portions at both the sides of the mouth portion 21 of the cassette shell 20 are set as tape drawing portions 22 each having a shape like a hollow prism is laid, and the front ends 22a of the tape drawing portions 22 are opened. The magnetic tape 30 is drawn from the openings 22a of the tape drawing portions 22, and runs between the openings 22a so as to traverse the front face of the mouth portion 21.

Two reel stand insertion ports 23 are juxtaposed at the right and left sides on the bottom surface wall of the cassette shell 20, and fitting holes (not show) of the tape reels 40, 50 are formed so as to downwardly face through the reel stand insertion ports 23. When the tape cassette 10 is loaded into a recording/reproducing apparatus (not shown), reel stands provided to the recording/reproducing apparatus are inserted from the reel stand insertion ports 23 into the cassette shell 20, so that reel fitting shafts provided to the reel stands are fitted into the fitting holes of the tape reels 40, 50 and the tape reels 40, 50 are mounted on the reel stands.

Two reel lock members 90 are disposed at the rear portion in the cassette shell 20, and when the tape cassette is unused, the pawls 91 of the reel lock members 90, 90 are engaged with engaging projections 41 and 51 formed on lower flanges of the tape reels 40, 50 to lock the tape reels 40, 50 so that the tape reels 40, 50 are not arbitrarily rotated. The reel lock members 90 are urged by springs (not shown) so as to lock the tape reels 40, 50. When the tape cassette 10 is loaded into the recording/reproducing apparatus (not shown), a lock release pin provided in the recording/reproducing apparatus is inserted from an insertion port 24 formed on the bottom surface of the cassette shell 20 to rotate the reel lock members 90 in such a direction as to release the lock, whereby the lock to the tape reels 40, 50 is released.

A light shielding barrel 25 is formed at the inside of the center in the right-and-left direction of the back face of the mouth portion 21 of the cassette shell 20. The light shielding barrel 25 has an opening 25a on the lower surface thereof and notches 25b at the right and left sides thereof.

Light-transmissible holes 25c are formed so as to near to the front ends of the side surface walls of the cassette shell 20 so that the notches 25b of the light shielding barrel 25 can be viewed from the light-transmissible holes 25c.

Cam portions 26 projecting forward are formed substantially at the upper half portion of the portions 22b located at the outside of the front end faces of the tape drawing portions 22. The front end faces 22b are located slightly back from the other three front end faces, and the front end faces 22b and the upper and lower front end faces 22c, 22d are set as advance stoppers which abut against stoppers provided in a cassette holder to regulate the insertion limit of the tape cassette 10 into a cassette holder (not shown) when the tape cassette 10 is inserted into the cassette holder.

Further, in-cassette guides 22e each having a semi-cylindrical shape are formed at positions which are located on the inner surface at the inside of the tape drawing portions 22 so as to be proximate to the openings 22a. The magnetic tape 30 under non-use state is tensely suspended between the tape drawing portions 22 while wound around the in-cassette guides 22e.

A downwardly-facing step portion 27a extending in the forward/backward direction is formed at a position nearer to the lower end on one side surface, that is, the right-hand surface of the cassette shell 20, a downwardly-facing step portion 27b is formed at a position nearer to the lower end of the lower half portion of the left-handed side surface, and slide grooves 28a and 28b which extend from a slightly back side of the center in the forward/backward direction to a position nearer to the front end are formed at positions which are slightly nearer to the upper ends of both the side surfaces. These slide grooves are designed in a two-step structure, that is, the deeper-slide grooves 28a are formed at the upper side of the shallow slide grooves 28b.

Further, a projection 29 extending in the right-and-left direction and in the upward direction is formed at the rear end portion of the cassette shell 20, and grooves 29a are formed from a position nearer to the upper end to the lower end on both the right and side surfaces of the projection 29.

The cassette shell 20 is designed by butting an upper shell 100 and a lower shell 110 from the upper and lower sides. The portions described above are formed while being shared to the upper shell 100 and the lower shell 110.

The upper shell 100 is integrally formed with an upper surface portion 101 serving as the whole portion of the upper surface of the cassette shell 20, a back surface portion 102 serving as the upper half portion of the rear surface of the cassette shell 20, side surface rear portions 103 serving as most of the side surface of the cassette shell 20 excepting for the lower end portion of the substantially rear half portion, side surface front portions 104*l* (left), 104*r* (right) serving as the upper end of the residual portion of the side surface of the cassette shell 20, and the front surface of the cassette shell, that is, the front portions 105 serving as the substantially upper side half portions of the both side portions excepting for the central portion of the back surface of the mouth portion 21. The side surface front portion 104*l* of the left side is formed so as to be located slightly back from the side edge of the upper surface portion 101.

The lower shell 110 is integrally formed with a bottom surface portion 111 serving as the whole portion of the bottom surface of the cassette shell 20, a rear surface portion 112 serving as the lower half portion of the rear surface of the cassette shell 20, side surface rear portions 113 serving as the lower end portions of the substantially rear half portions of the side surfaces of the cassette shell 20, side surface front portions 114 serving as the portions of the side surfaces of the cassette shell 20 excepting for the upper end portions of the residual portions thereof, the front surface of the cassette shell 20, that is, a front surface central portion 115 serving as the central portion of the back surface of the mouth portion 21, front surface side portions 116 serving as the substantially lower side half portions of both the side portions of the mouth portion 21 and inner side surface portions 117 serving as the inner side surface portions of the tape drawing portions 22.

The portion 114a corresponding to the lower end of the side surface rear portion 103 of the upper shell 100 in the rear half portion of the right-hand side surface front portion 114 is formed to have a small thickness, so that the outer surface of the portion 114a is kept depressed and a downwardly facing step portion 114b is formed at the upper end portion of the portion 114a. An upwardly recessed groove 114b' is formed in the inner site of the step portion 114b. The outer surface of the left-hand side surface front portion 114 is located back from the outer surface of the side surface rear portion 103 of the upper shell 100. Further, notches 114c opened upwardly are formed at portions nearer to the rear ends of the side surface front portions 114. The inner surfaces 114d of the side surface front portions 114 are designed so that the thickness thereof is reduced toward the front end, and thus the tape drawing portions 22 are designed to be outwardly spread toward the openings 22a. Slender recess portions 114e and 114f extending forward and backward are formed at the upper end portions of the outer surfaces of the side surface front portions 114, except for the front end portion of the upper end portion. The recess portions 114e are shallow recess portions formed at the side surface front portions 114, and deep recess portions 114f are formed at the upper sides of the recess portions 114e. The side surface rear portions 113 are formed at the inner sides of the side surface rear portions 103 of the upper shell 100.

The recess stripes 21a at the back surface of the mouth portion 21 are formed at the front surface portions 105 of the upper shell 100 and at the front surface side portions 116 of the lower shell 110. The reel stand insertion ports 23, the insertion port 24 and the light shielding barrel 25 are formed on the bottom surface portion 111 of the lower shell 110, and the cam portions 26, 26 are formed at the front end portions of the side surface front portions 114, 114 of the lower shell 110.

The step portions 27a, 27b are formed by the lower ends of the side surface-rear portions 103 of the upper shell 100, and the right-hand step portion 27a of these step portions is linked to the step portion 114b formed at the right-hand side surface front portion 114 of the lower shell 110.

Further, the slide grooves 28a and 28b are formed by the recess portions 114f and 114e formed at the side surface front portions 104l, 104r of the upper shell 100 and at the upper end portions of the side surface front portions 114 of the lower shell 110.

The projecting portions 29 are formed over the upper surface portion 101 and the side surface rear portions 103 of the upper shell 100 and the side surface rear portions 113 of the lower shell 110.

The upper ends of the notches 114c formed at the side surface front portions 114 of the lower shell 110 are closed by the upper shell 100 to thereby form the light-transmissible holes 25c.

The upper shell 100 and the lower shell 110 are butted against each other from the upper and lower sides, and coupled to each other by screws 120 to form the cassette shell 20.

The slider 80 is formed of a thin metal plate, preferably a metal plate having conductivity. The slider 80 is constructed by integrally forming an upper surface portion 81 having a recess shape elongated in the right-and-left direction with side surface portions 82 which are downwardly projected from the right and left side edges of the upper surface portion 81. Substantially lower half portions are cut out from the front end portions of the side surface portions 82, and shaft holding portions 82a having substantially ¾ circular shape are formed at the upper edge portions of the notches. Slide projections 82b, 82c are formed at slightly front sides of the center portions in the forward/backward direction of the side surface portions and in the vicinity of the upper ends thereof as if they are cut out and erected, and these slide projections 82b, 82c are designed so that the left-hand slide projection 82b is longer than the right-hand slide projection 82c, and the tip portions 82b', 82c' of the slide projections 82b, 82c are bent upwardly. Further, the lower end portions of the side surface portions 82 are inwardly folded to form slide fitting portions 82d having U-shaped section.

A back lid 70 is integrally formed with the slider 80. The upper end edge of the back lid 70 is integrally formed with the front edge of the upper surface portion 81 of the slider 80. The back lid 70 is constructed by a main portion 71 extending vertically and having the same width in the right-and-left direction as the mouth portion 21, a lower end closing portion 72 which extends from the lower end edge of the main portion 71 forward and slightly downwardly, and an abutting portion 73 extending downwardly from the lower end closing portion 72, which are integrally formed with one another. The lower end portion of the abutting portion 73 is folded from the back side, that is, the rear side. By forming the folded portion 73a, the lower end of the abutting portion 73 is prevented from having a sharp edge. Since there is no sharp edge as described above, the magnetic tape 30 and members at the mechanical deck side such as a pinch roller can be prevented from being damaged.

Further, ribs 71a extending in the up-and-down direction are formed at the main portion 71 of the back lid 70 so as to be embossed backward. Formation of these ribs 71a enhances the strength of the back lid 70, so that the back lid 70 can be formed of material having small rigidity such as a thin metal plate and thus the weight can be reduced. In addition, these ribs 71a are formed at the positions corresponding to the recesses stripes 21a formed on the back surface of the mouth portion 21 of the cassette shell 20, and thus when the back lid 70 is moved back, the ribs 71a enter the recess stripes 21a, whereby the back lid 70 can be moved back as much as possible, and the size of the mouth portion 21 can be prevented from being reduced due to the provision of the ribs 71a under use state. In addition, the recess stripes 21a are formed at positions other than the portions facing the maximum outer diameter portions of the tape reels 40, 50 disposed in the cassette shell 20, so that the size of the cassette shell 20, particularly the size in the frontward/ backward direction of the cassette shell 20 can be prevented from being increased due to the provision of the recess stripes 21a.

The slider 80 is mounted in the cassette shell 20 so as to be freely slidable in the forward/backward direction as follows.

The slider 80 is backward slid while the main portion 81 of the slider 80 is mounted on the front end portion of the upper surface portion 101 of the upper shell 100. The slide fitting portions 82d of the slider 80 are freely slidably fitted to the lower edges of the side surface rear portions 103 of the upper shell 100. Further, the slide projections 82b, 82c of the slider 80 are located at the lower sides of the side surface front portions 104l, 104r of the upper shell 100, and the upwardly bent tip portions 82b', 82c' are allowed to be fitted to the inner surfaces of the side surface front portions 104l, 104r.

Therefore, when the lower shell 110 and the upper shell 100 are coupled to each other, the slide projections 82b, 82c of the slider 80 are freely slidably located in the grooves 28a elongated in the forward/backward direction which are formed by the side edge portions of the upper shell 100 and the recess portions 114e of the lower shell 110, whereby the slider 80 is mounted in the cassette shell 20 so as to be freely slidable in the forward/backward direction. The rear end of the movable region of the slider 80 is the position at which the rear end of the main portion 81 of the slider 80 abuts against the projection 29 of the cassette shell 20, and the front end thereof is the position at which the right-hand slide fitting portion 82d of the slider 80 abuts against the front end of the right-hand thin portion 114a of the cassette shell 20 or the position at which the fitting projections 82b, 82c of the slider 80 abut against the front ends of the recess portions 114f of the cassette shell 20.

The front lid 60 is freely rotatably supported on the front end portion of the slider 80. The front lid 60 is constructed by forming a front surface portion 61 elongated substantially in the right-and-left direction integrally with side surface portions 62 projecting backward from the right and left end edges of the front surface portion 61. The upper end portion 61a of the front surface portion 61 is gently bent so as to be displaced backward as it extends upwardly.

Thick portions 63 are formed so as to be brought into contact with the joint portions with the front surface portion 61 on the inner surfaces of the side surface portions 62, and regulating faces 64 having an arcuate face viewed from the side are formed at the thick portions 63. Rotational fulcrum shafts 65, 66 are projectingly formed substantially at the center portions of the inner surfaces of the side surface portions 62 so as to confront the regulating faces 64. Further, annular grooves 65a, 66a are formed at the base portions of the rotational fulcrum shafts 65, 66. The left-hand rotational fulcrum shaft 65 is provided with the annular groove 65a, a large-diameter portion 65b and a small-diameter portion 65c which are linked to one another in this order, and the overall length is set to be larger than that of the right-hand rotational fulcrum shaft 66. The regulating faces 64 are formed to have arcuate faces with each of the rotational fulcrum shafts 65, 66 at the center thereof.

A support shaft 67 is projectingly provided at a position which is away from the rotational fulcrum shaft 65 of the inner surface of the left-hand side surface portion 62 in the lower backward direction. A lock pin 68 is projectingly provided at the back side of the rotational fulcrum shaft 65 of the inner surface of the left-hand side surface portion 62.

Further, light-transmissible holes 69 are formed upward just at the back sides of the rotational fulcrum shafts 65, 66 on the side surface portions 62.

Still further, a fitting recess portion 61b which is opened in the front and side directions is formed at a position near to the lower end of the left end of the front surface portion 61, and an insertion notch 61c is formed near to the left end of the lower edge of the front surface portion 61.

The annular grooves 65a, 66a of the rotational fulcrum shafts 65, 66 of the front lid 60 are rotatably fitted to the shaft holding portions 82a of the slider 80, whereby the front lid 60 is rotatably supported at the front end portion of the slider 80.

A lid lock member 130 is secured to the inner side of the left-hand side surface portion 62 of the front lid 60. The lid lock member 130 is designed to be slender as a whole, and a support hole 131 is formed at the center portion thereof. The support shaft 67 of the left-hand side surface portion 62 of the front lid 60 is inserted through the support hole 131, whereby the lid lock member 130 is freely rotatably supported on the side surface portion 62.

When the lid lock member 130 is oriented in the lower right direction viewed from the left side (see FIG. 14), a hook pawl 132 projecting forward is formed at the upper end portion so as to be hooked to the upper surface of the slide projection 82b formed at the left-hand side surface portion 82 of the slider 80 from the back side. A fitting recess portion 133 which his opened in a slant upper direction and at the side confronting the inner surface of the left-hand side surface portion 62 of the front lid 60 is formed at a position near to the tip at which the hook pawl 132 is formed. Further, a spring hook face 134 is formed by notching the opposite surface to the surface confronting the side surface portion 62 between the support hole 131 and the lower end. The front side portion 135 of the lower end face is designed as an arcuate face.

By providing a torsion coil spring 140, each of the front lid 60 and the lid lock member 130 is urged in a predetermined direction.

The coil portion 141 of the torsion coil spring 140 is fitted on the outer periphery of the large-diameter portion 65b of the rotational fulcrum shaft 65 formed at the left-hand side surface portion 62 of the front lid 60, and one arm piece 142 is brought into elastic contact with the upper surface of the slide projection 82b formed at the left side portion 82 of the slider 80 from the front side. The other arm piece 143 is brought into elastic contact with the spring hook face 134 of the lid lock member 130 (see FIG. 14), whereby the lid lock member 130 is urged in the clockwise direction viewed from the left side, and the front lid 60 is urged in the clockwise direction viewed from the left side through the lid lock member 130 and the support shaft 67, that is, it is urged so as to close the front side of the mouth portion 21 by the main portion 61.

Since the lid lock member 130 and the torsion coil spring 140 are located at the inner sides of the side surface portions 62 of the front lid 60 as described above, since the lid lock member 130 and the torsion coil spring 140 are not exposed to the outside even when the lid lock member 130 is rotated, and thus it is impossible to touch the lid lock member 130 and the torsion coil spring 140 with a finger or remove them unless the slider 80 is detached from the cassette shell 20. Further, even when the front lid 60 is rotated, the lid lock member 130 is not exposed to the outside. Further, the lid lock member 130 locks the front lid 60 not to open. However, the front lid 60 and the slider 80 are pressed by the force of the torsion coil spring 140, and thus it absorbs the backlash of the front lid 60 and the slider 80.

An in-cassette memory 150 is accommodated in a memory accommodating groove 118 formed at the right rear end portion of the lower shell 110. The in-cassette memory 150 is designed so that a memory element 152 is mounted at the central portion of a laterally elongated rectangular board 151 and a communication antenna 153 is spirally formed with a conductive pattern on the front and back surfaces of the board 151. The in-cassette memory 150 is communicated with the outside through the antenna 153, and the type of the magnetic tape, data of recording contents, etc. are recorded therein.

One end portion of reel press springs 160 is fixed to the lower surface of the upper surface portion 101 of the upper shell 100, and the upper end centers of the tape reels 40, 50 are pressed by the other end portions of the reel press springs 160 to press the reels 40, 50 against the bottom surface portion 111 of the lower shell 110.

The fabrication of the tape cassette 10 described above is performed in the following procedure. First, there are formed three units of a lower shell unit having the respective members fabricated in the lower shell 110, an upper shell unit having the respective members fabricated in the upper shell 100 and a slider unit in which the front lid 60 having the lid lock member 130, etc. fabricated in the slider 80 is fabricated, then the slider unit is fabricated in the upper shell unit, and finally the upper shell unit having the slider unit fabricated therein and the lower shell unit are coupled to each other.

Figure 3:
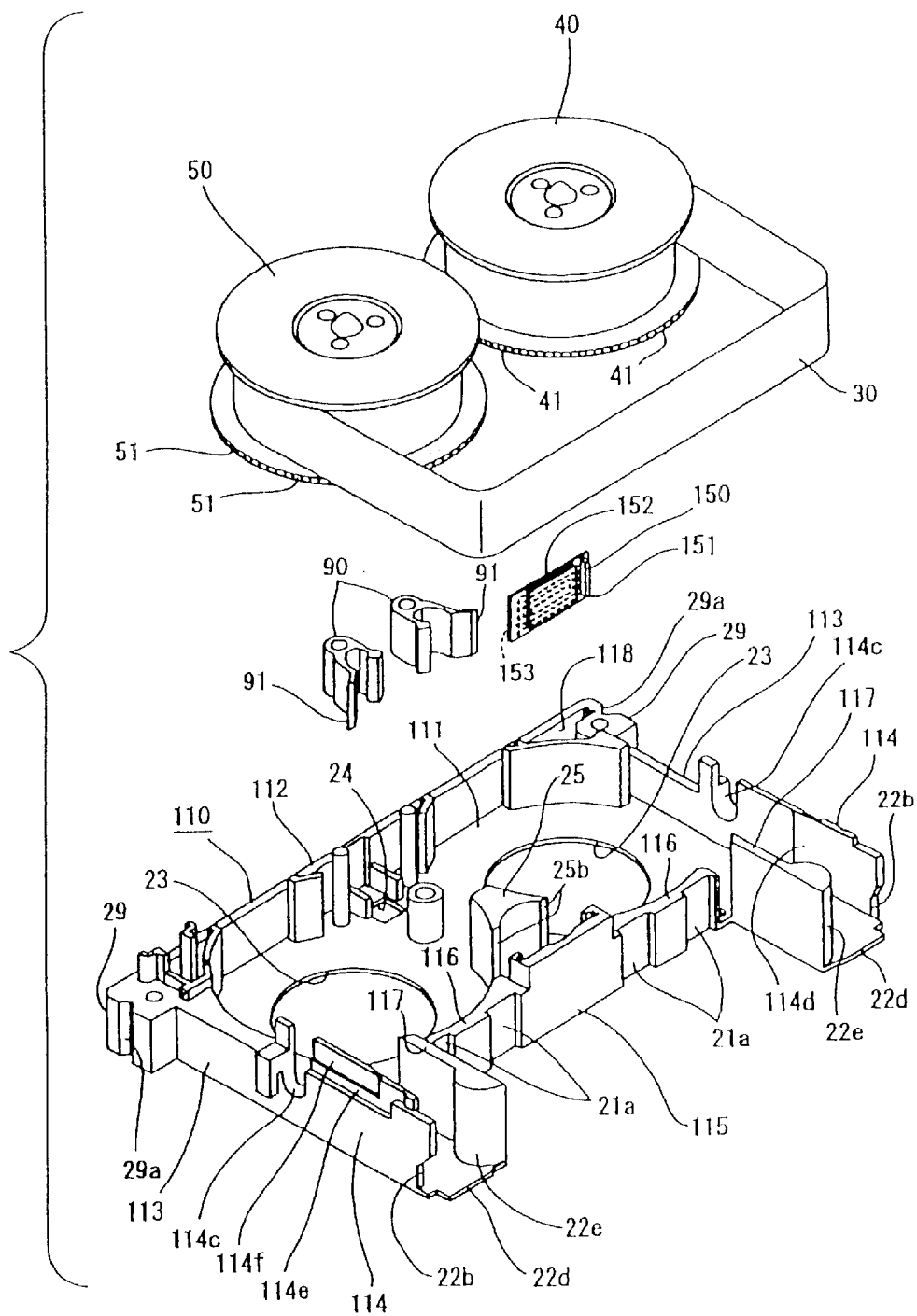
FIG. 3 is an exploded perspective view showing a lower shell unit.
Figure 4:
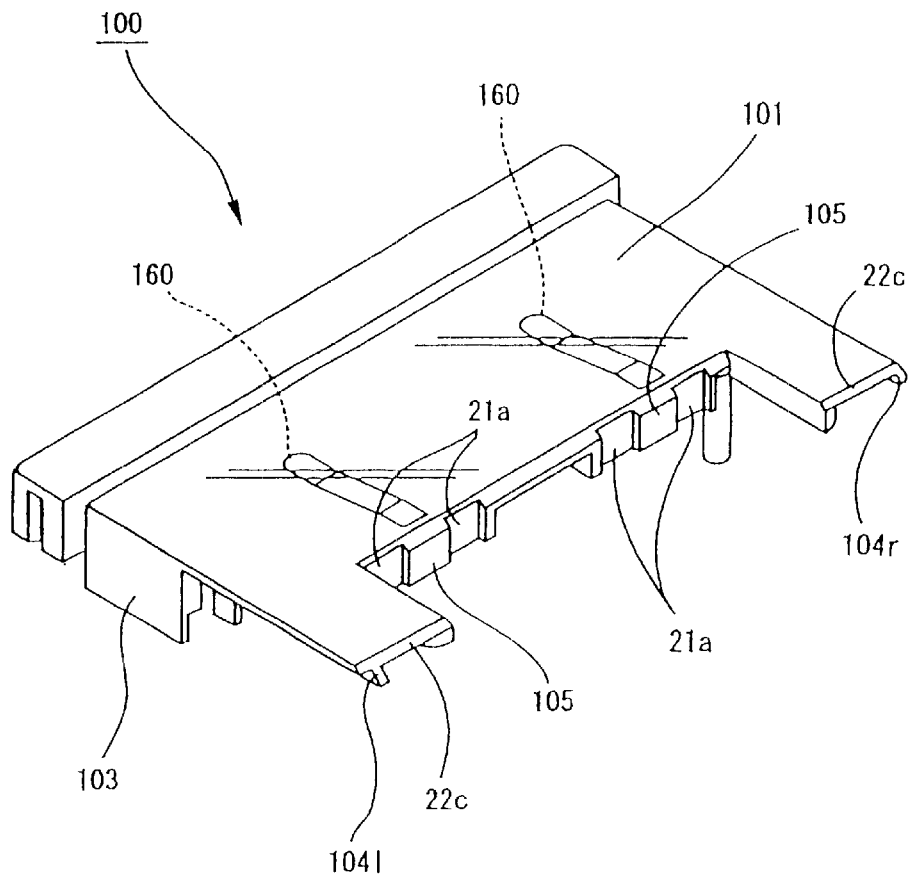
FIG. 4 is a perspective viewing an upper shell unit.
Figure 5:
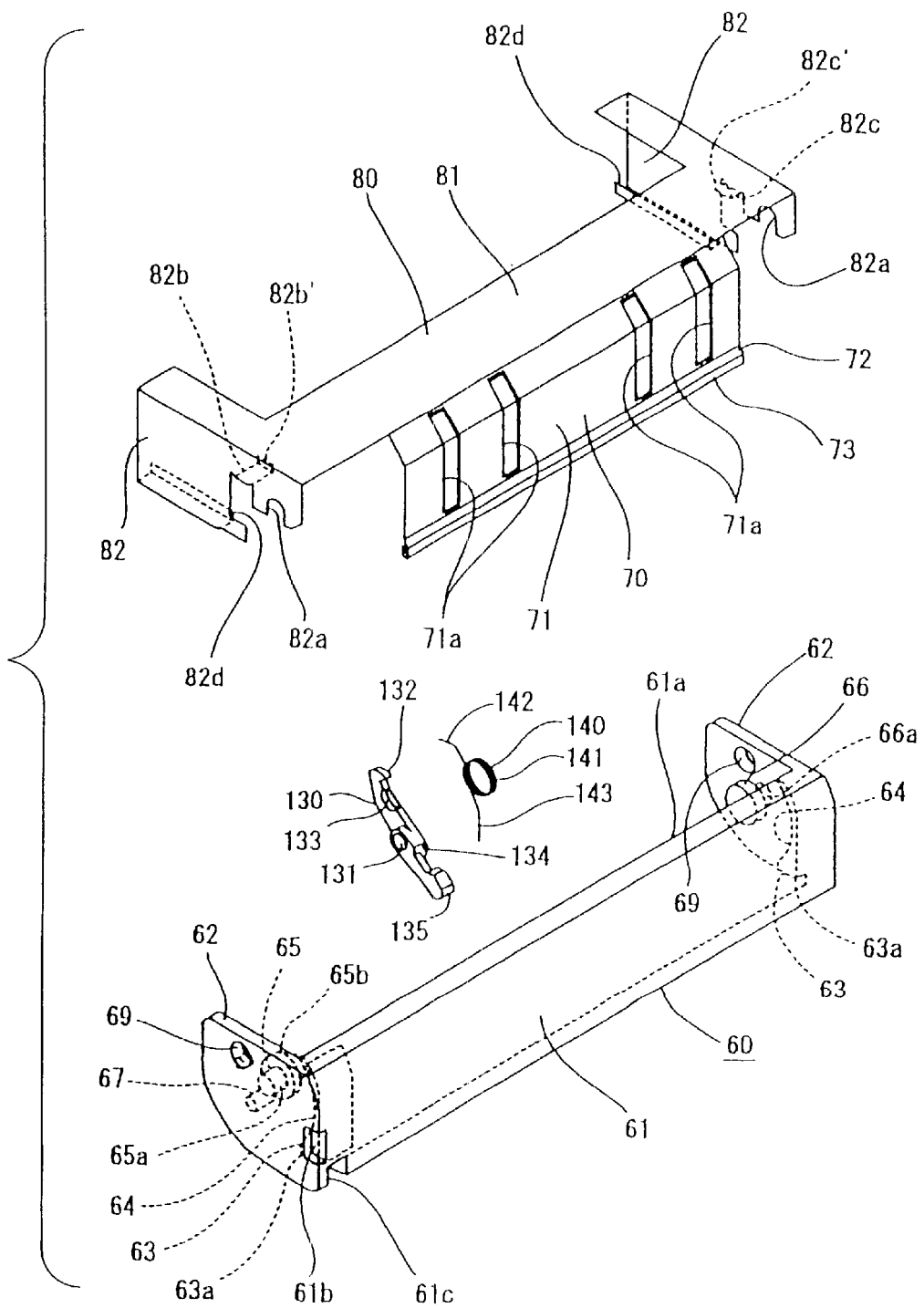
FIG. 5 is an exploded perspective view showing a slider unit.
Figure 7:
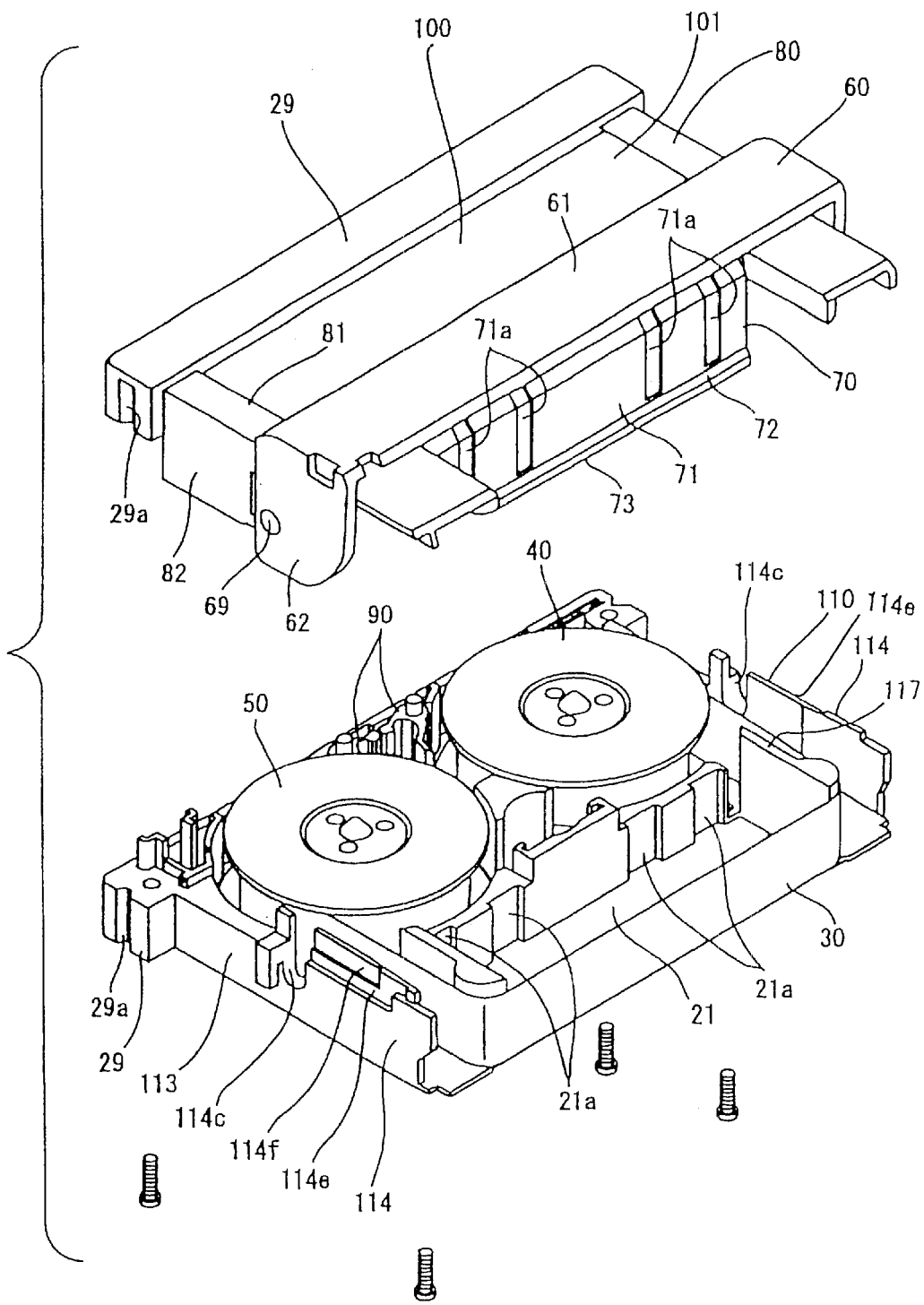
FIG. 7 is an exploded perspective view showing the upper shell unit having the slider unit installed therein and the lower shell unit separately from each other.
Figure 8:
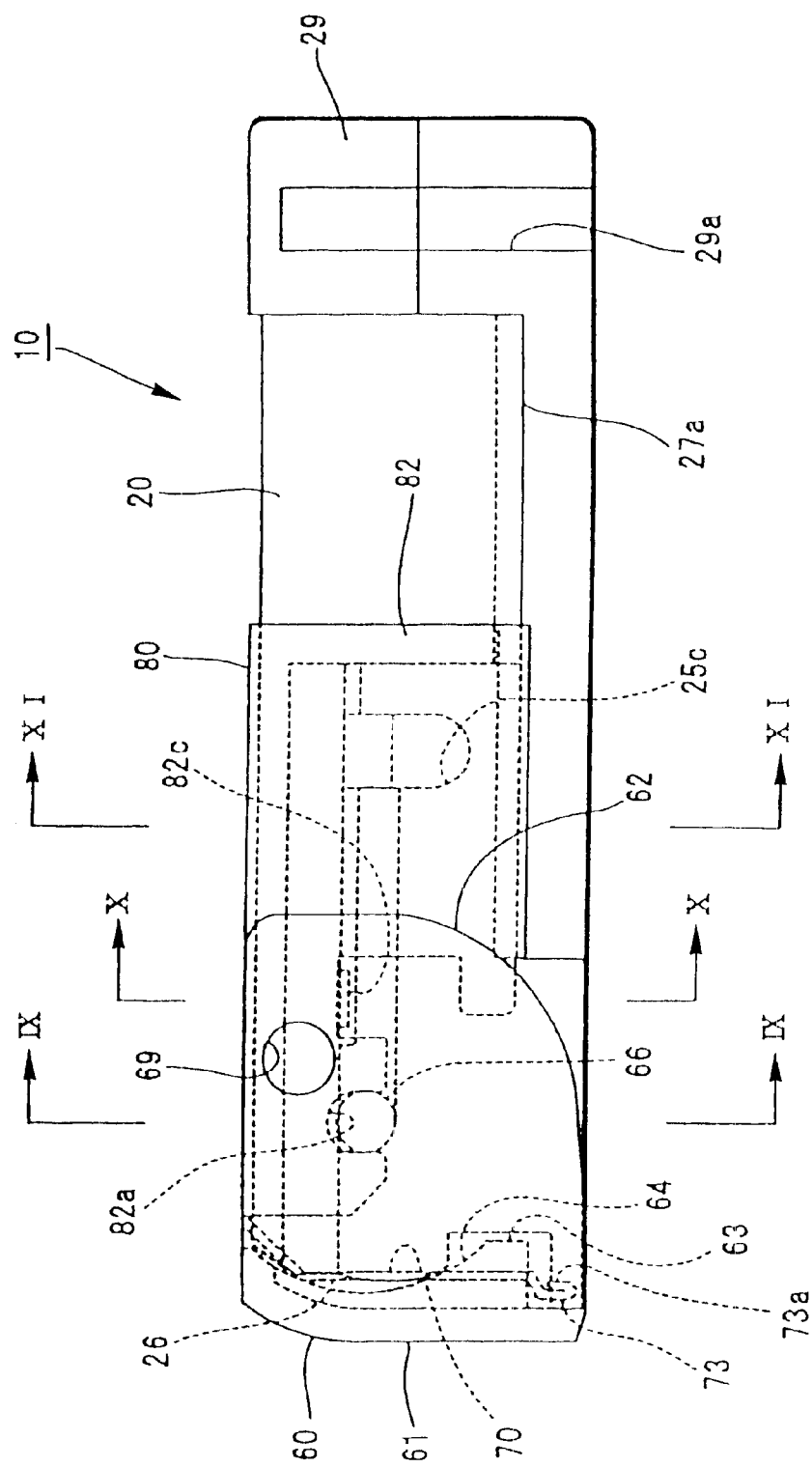
FIG. 8 is a right side view showing a tape cassette.
Figure 9A:
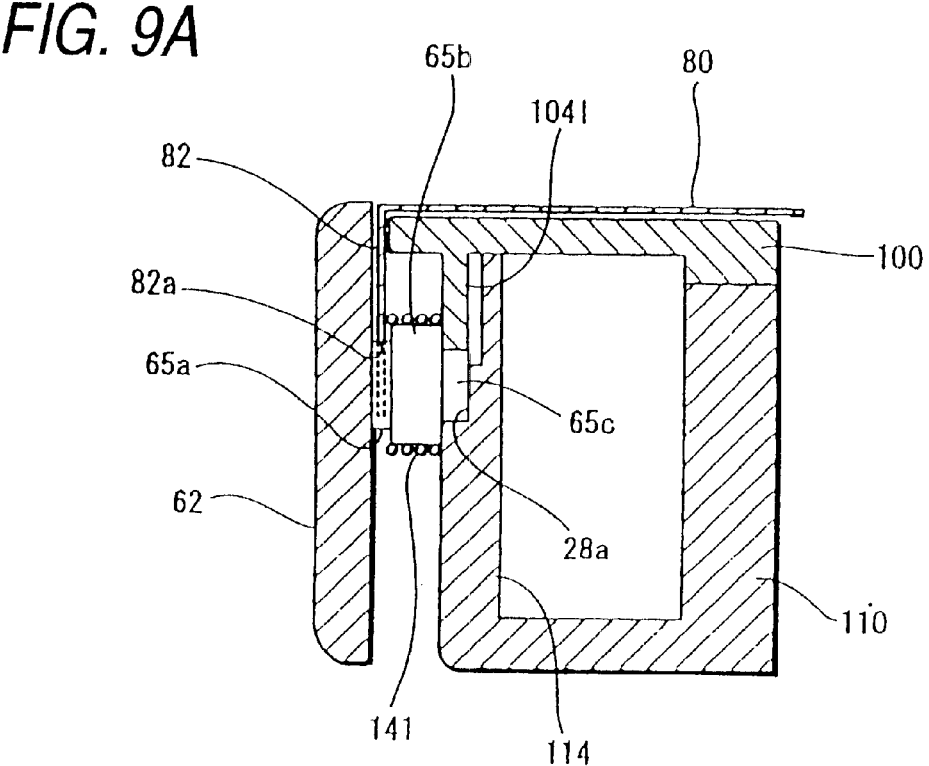
Figure 9B:
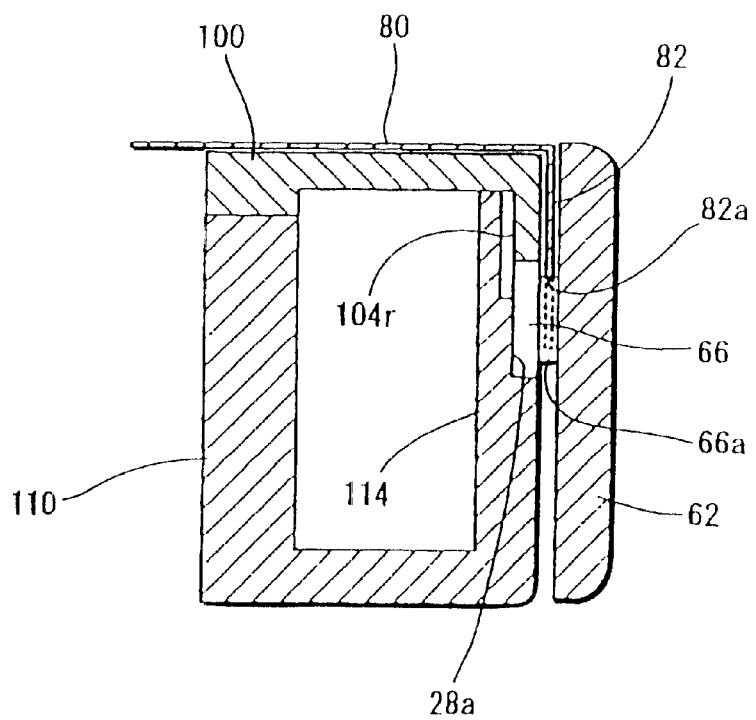
Figure 10A:
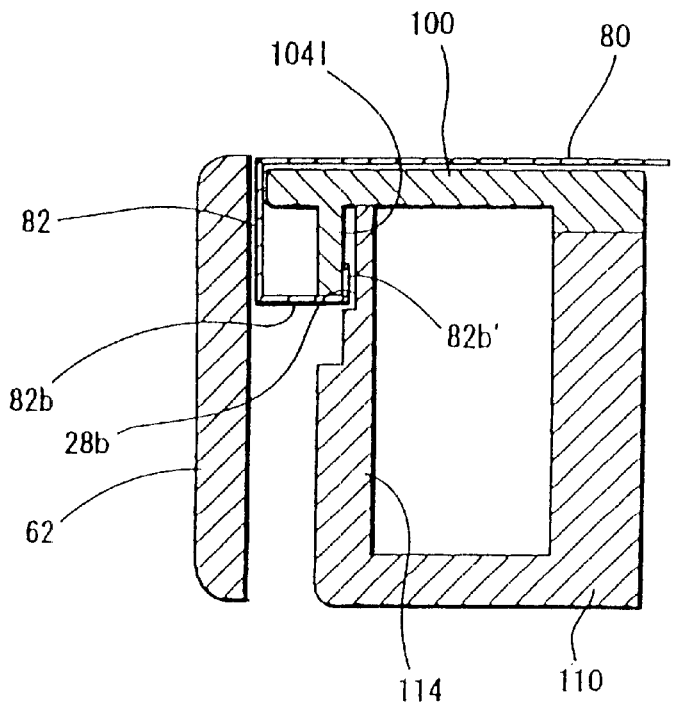
Figure 10B:
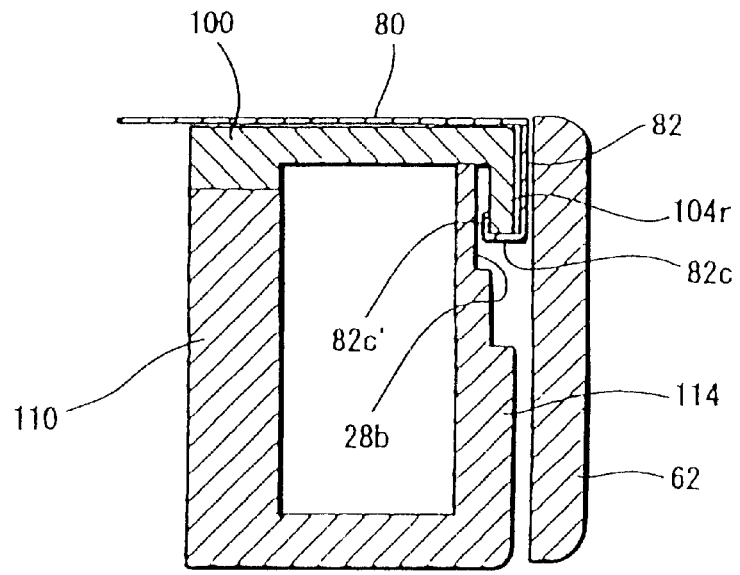

The lower shell unit is formed by fabricating into the lower shell 110 the tape reels 40, 50 around which the magnetic tape 30 is wound, the reel lock members 90, the in-cassette memory 150, etc. (see FIG. 3, FIG. 7). The upper shell unit is formed by fabricating the reel press springs 160 into the upper shell 100 (see FIG. 4). The slider unit is formed by supporting on the slider 80 the front lid 60 having the lid lock member 130 and the torsion coil spring 140 fabricated therein (see FIG. 5).

Figure 6:
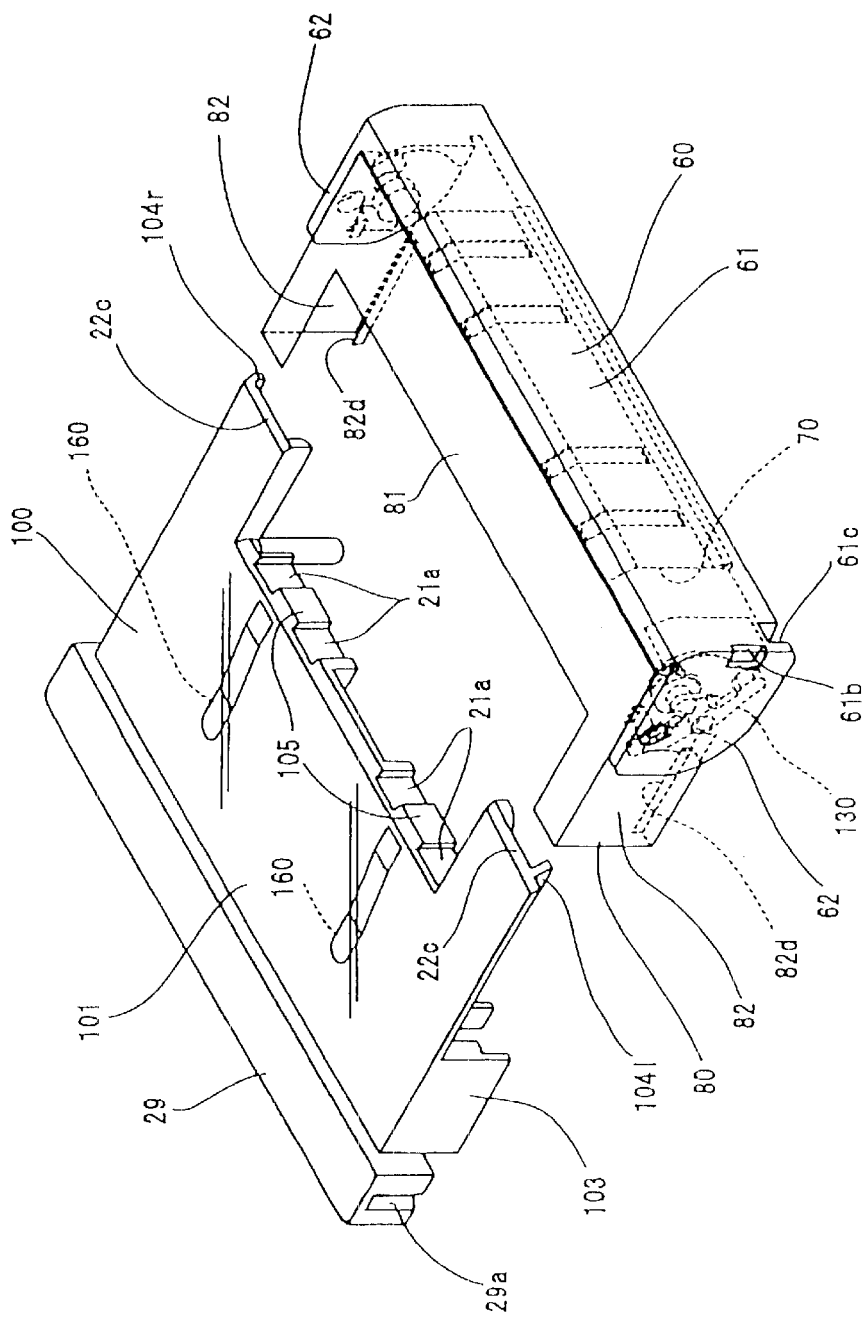
FIG. 6 is an exploded perspective view showing the upper shell unit and the slider unit.
Figure 20A:
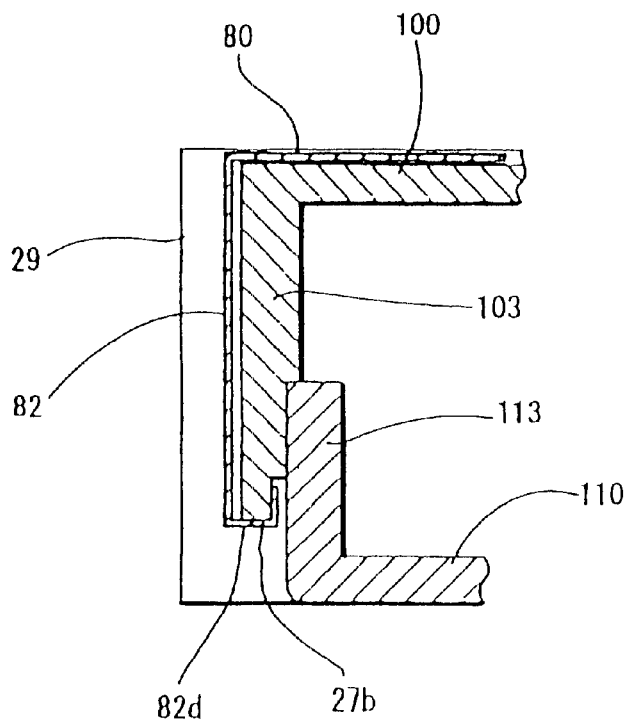
Figure 20B:
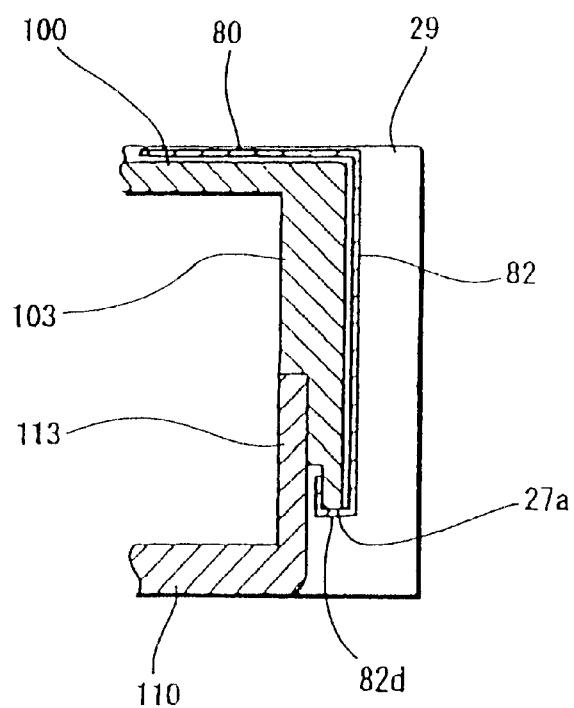

The slider unit is fabricated into the upper shell unit while the front lid 60 is upwardly rotated. That is, the slider 80 is backward slid while the main portion 81 of the slider 80 is mounted on the front end portion of the upper surface portion 101 of the upper shell 100, whereby the slide fitting portions 82d of the slider 80 are freely slidably fitted to the lower end edges of the side surface rear portions 103 of the upper shell 100 (see FIGS. 20A and 20B). The slide projections 82b, 82c of the slider 80 are located at the lower sides of the side surface front portions 104l, 104r of the upper shell 100 and kept fitted to the inner surface thereof (see FIG. 6, FIG. 7). The state shown in FIG. 7 indicates a state where the slider unit having the front lid 60 fabricated in the slider 80 is fabricated in the upper shell unit.

Figure 11A:
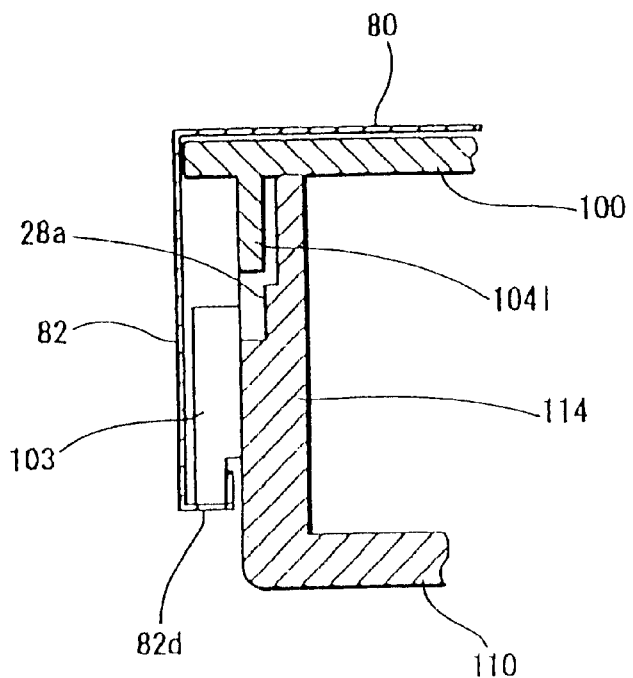
Figure 11B:
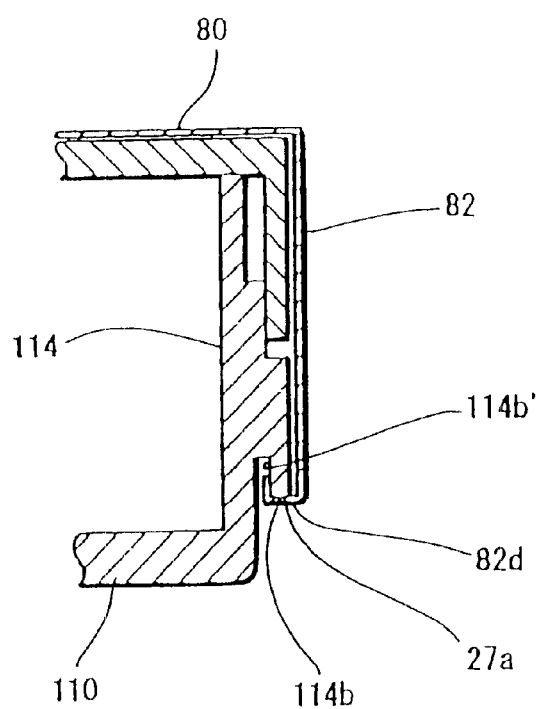
Figure 12:
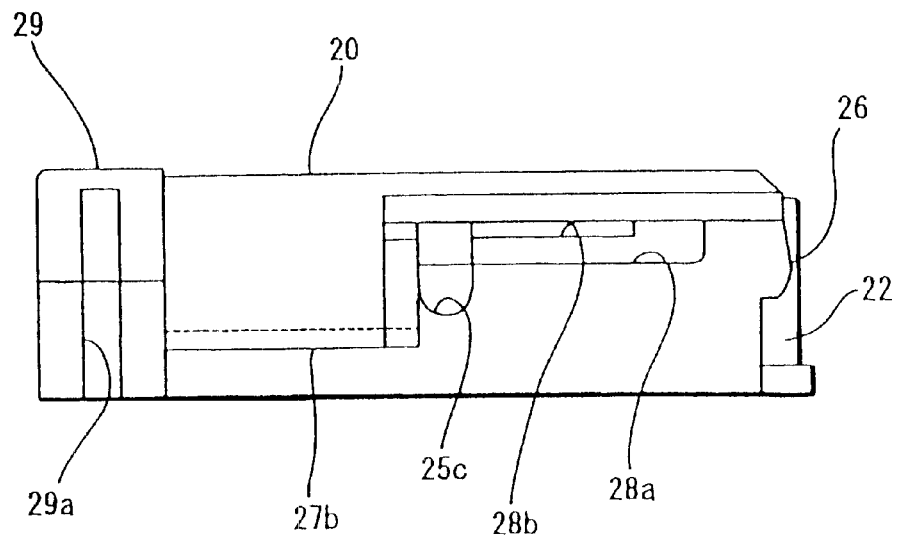
FIG. 12 is a left side view showing a cassette shell.
Figure 13:
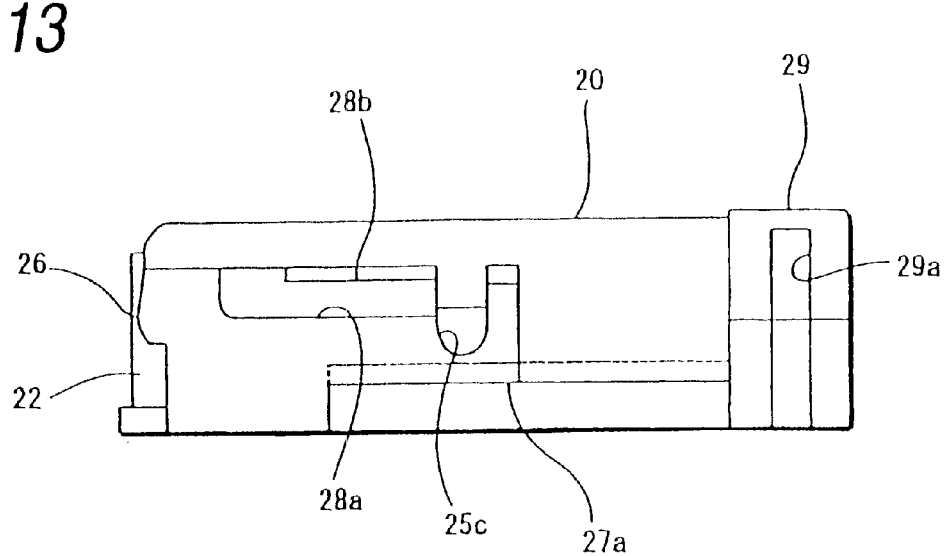
FIG. 13 is a right side view showing the cassette shell.

In this state, the upper shell unit having the slider unit fabricated therein is coupled to the lower shell unit. That is, the lower end of each portion of the upper shell 100 of the upper shell unit is butted to the upper end of each portion of the lower shell 110 of the lower shell unit from the upper and lower sides. Under this state, the slider 80 is slid to the front end, and the front lid 60 is downwardly rotated. With this operation, the right-hand slide fitting portion 82d of the slider 80 is fitted to the step portion 114b and the groove 114b' of the lower shell 110 (see FIGS. 11A and 11B), and the upper shell 100 and the lower shell 110 are temporarily coupled to each other through the slider 80, so that the upper shell 100 and the lower shell 110 are not detached from each other and thus a next work can be easily carried out. Further, the small-diameter portion 65c of the left-hand rotational fulcrum shaft 65 of the front lid 60 is freely slidably fitted to the shallow slide groove 28b formed at the left-hand side surface of the cassette shell 20, and the right-hand rotational fulcrum shaft 66 is freely slidably fitted to the shallow slide groove 28b formed on the right-hand side surface of the cassette shell 20. Accordingly, the rotational fulcrum shafts 65, 66 of the front lid 60 are movable in the forward/backward direction while the movement in the up-and-down direction thereof is restricted by the shallow slide grooves 28b. In this state, the upper and lower shells 100, 110 are coupled to each other by screws 120 (see FIG. 7), thereby completing the tape cassette 10 (see FIG. 1).

As described above, in the tape cassette 10, the overall constituent parts are grouped into the three portions of the lower shell unit, the upper shell unit and the slider unit as if they are three parts, and these units are successively fabricated as described above, so that the management of the parts in some midpoint of the fabrication process can be easily performed and the fabrication itself can be simply performed.

Under the non-use state, the front and back sides of the magnetic tape 30 are covered by the front lid 60 and the back lid 70, the lower side thereof is covered by the lower end closing portion 73 of the back lid 70, and the upper side thereof is covered by the upper end portion 61a of the main portion 61 of the front lid 60. Accordingly, adhesion of dust to the magnetic tape 30 can be prevented, and touch of the magnetic tape 30 by foreign matter or fingers can be prevented. The front end surfaces of the tape drawing portions 22, that is, 22b, 22c, 22d, etc. are covered by the main portion 61 of the front lid 60, and thus it is made look more attractive. The hook pawl 132 of the lid lock member 130 is hooked to the upper surface of the slide projection 82b of the slider 80 from the back side, whereby the front lid 60 is locked at the closing position shown in FIG. 1.

As omitted from the illustration, an erroneous deletion preventing tag is provided on the back surface of the cassette shell 20, and the erroneous deletion preventing tag is moved in the height direction of the cassette shell 20 to set a recordable state or unrecordable state.

Next, use of the tape cassette 10 described above will be described.

A plate-shaped support member 170l is erected at the position corresponding to the left-hand end portion of the tape cassette 10 of the cassette holder (not shown) for holding the tape cassette 10 and loading the tape cassette 10 to a predetermined position of a recording/reproducing apparatus, and a lid opener 180 and a lid press projection 190 are provided to the support member 170l.

The lid opener 180 is designed in the form of a long arm, and the upper end portion thereof is freely rotatably supported on the upper end portion of the right-hand surface of the support member 170l. A fitting projection 181 is projectingly provided to the right-hand surface of the rotational end portion of the lid opener 180. The coil portion 201 of the torsion coil spring 200 is fitted to the outer periphery of the rotational shaft 182 of the lid opener 180. From the upper side, one arm 202 comes into elastic contact with a spring hook piece 171 projected to the right as if a part of the support member 170l is cut out and erected, and the other arm 203 comes into elastic contact with a position of the front edge of the lid opener 180 which is nearer to the rotational fulcrum, whereby the lid opener 180 is urged in a clockwise direction viewed from the left side (see FIG. 14). The portion of the lid opener 180 which is nearer to the upper end abuts against the spring hook piece 171, whereby it is kept in a vertical position so that the rotational end thereof is located at the lower end.

The lid press projection 190 is projected. from the right-hand side surface of the upper end portion of the support member 170. A lock release cam 210 is provided so as to be proximate to the right-hand side surface of the base end portion of the support member 170*l*. The lock release cam 210 is designed so that the end surface side thereof into which the tape cassette 10 is inserted serves as a slant portion 211. The width in the right-and-left direction of the lock release cam 210 is set to be slightly smaller than that of the insertion notch 61c formed in the main portion 61 of the front lid 60.

A support member 170r similar to the support member 170*l* is erected at the position corresponding to the right-hand end portion of the tape cassette 10 of the cassette holder, and a lid press projection 190 is provided at the upper end portion of the left-hand surface of the support member 170r.

Figure 14:
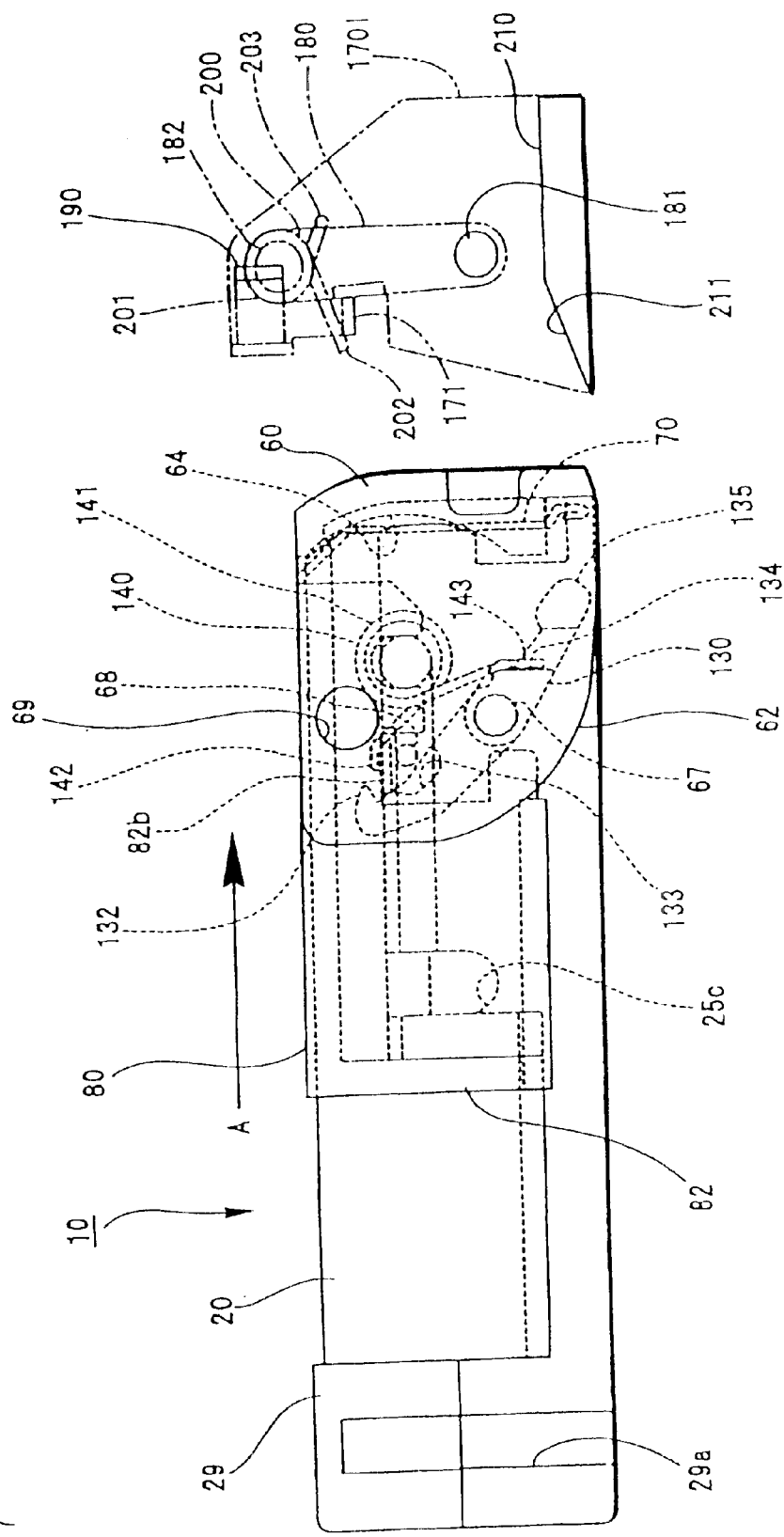
FIG. 14 is a partially-notched side view showing a state where a tape cassette is started to be inserted into a cassette holder.
Figure 15:
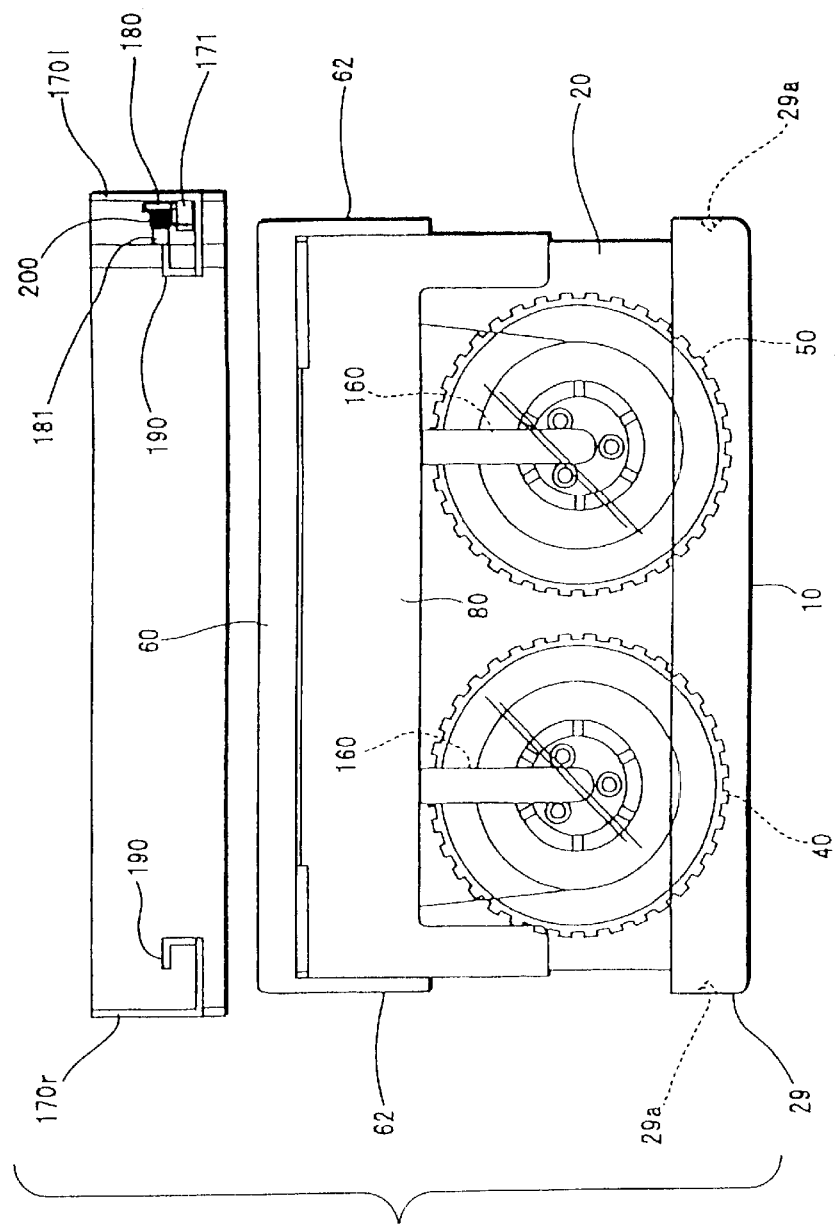
FIG. 15 is a schematic plan view showing a state where the tape cassette is started to be inserted into the cassette holder.
Figure 16:
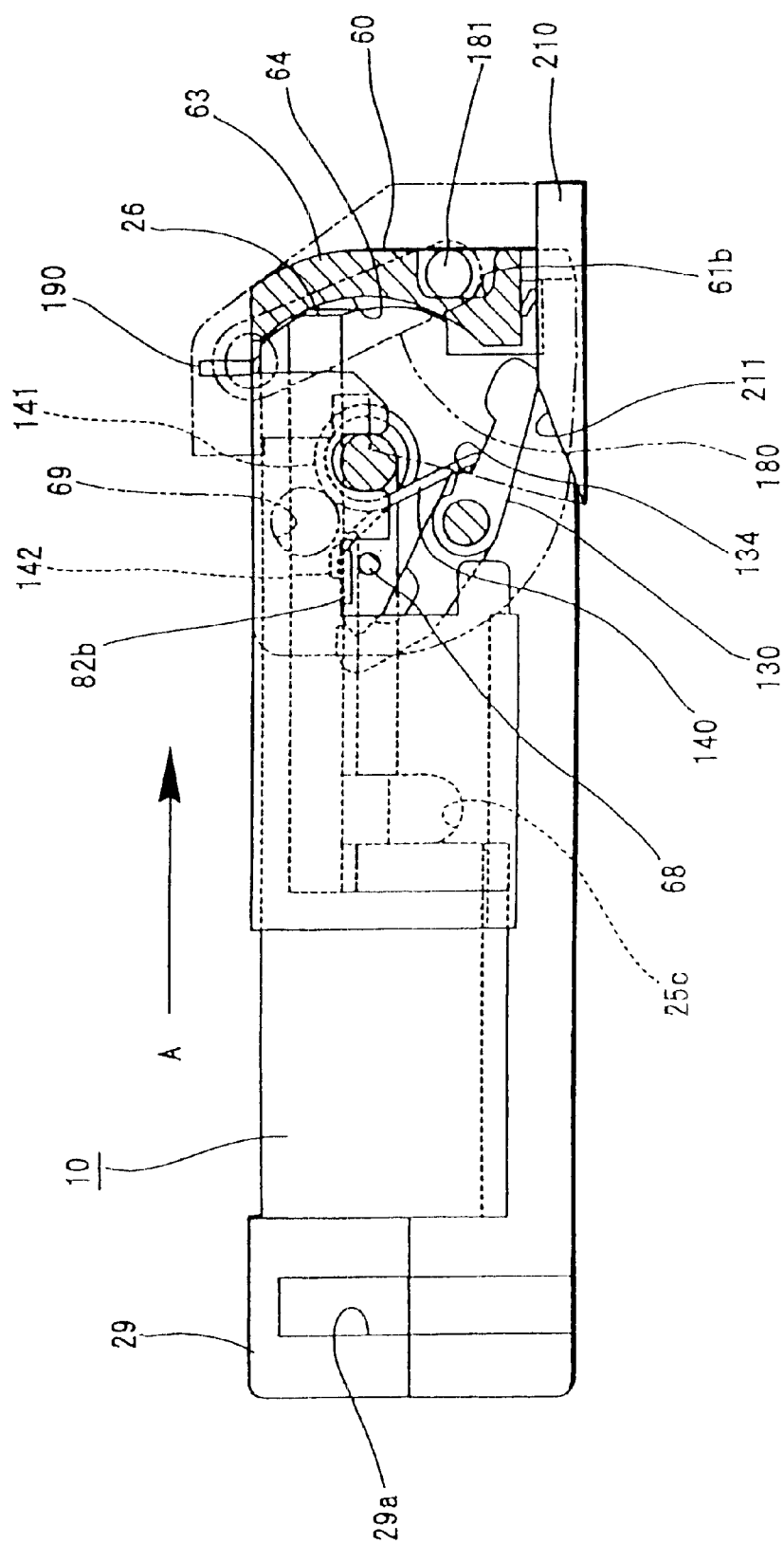
FIG. 16 is a partially-notched side view showing a state where a locking state by a lid lock member is released.

When the tape cassette 10 is inserted into the cassette holder from the front surface side, that is, the side of the front lid 60 in a direction of an arrow A of the FIG. 14, the front end portion of the tape cassette 10 is inserted between the support members 170*l* and 170r. The lock release cam 210 is relatively inserted from the insertion notch 61c formed in the main portion 61 of the front lid 60 into the inside of the front lid 60. The fitting projection 181 of the lid opener 180 is fitted to the fitting recess portion 61b of the front lid 60, and the lower end arcuate face 135 of the lid lock member 130 is slip up along the slant portion 211 of the lock release cam 210, whereby the lid lock member 130 is rotated in a counterclockwise direction in FIG. 16 and the hook of the hook pawl 132 to the slid projection 82b of the slider 80 is released. Accordingly, the lock of the front lid 60 at the closing position is released. The lid lock member 130 is separated from the lock release cam 210, so that the lock release cam 210 can be inserted into the deep position, and there is required no precision with respect to the stop position.

Figure 17:
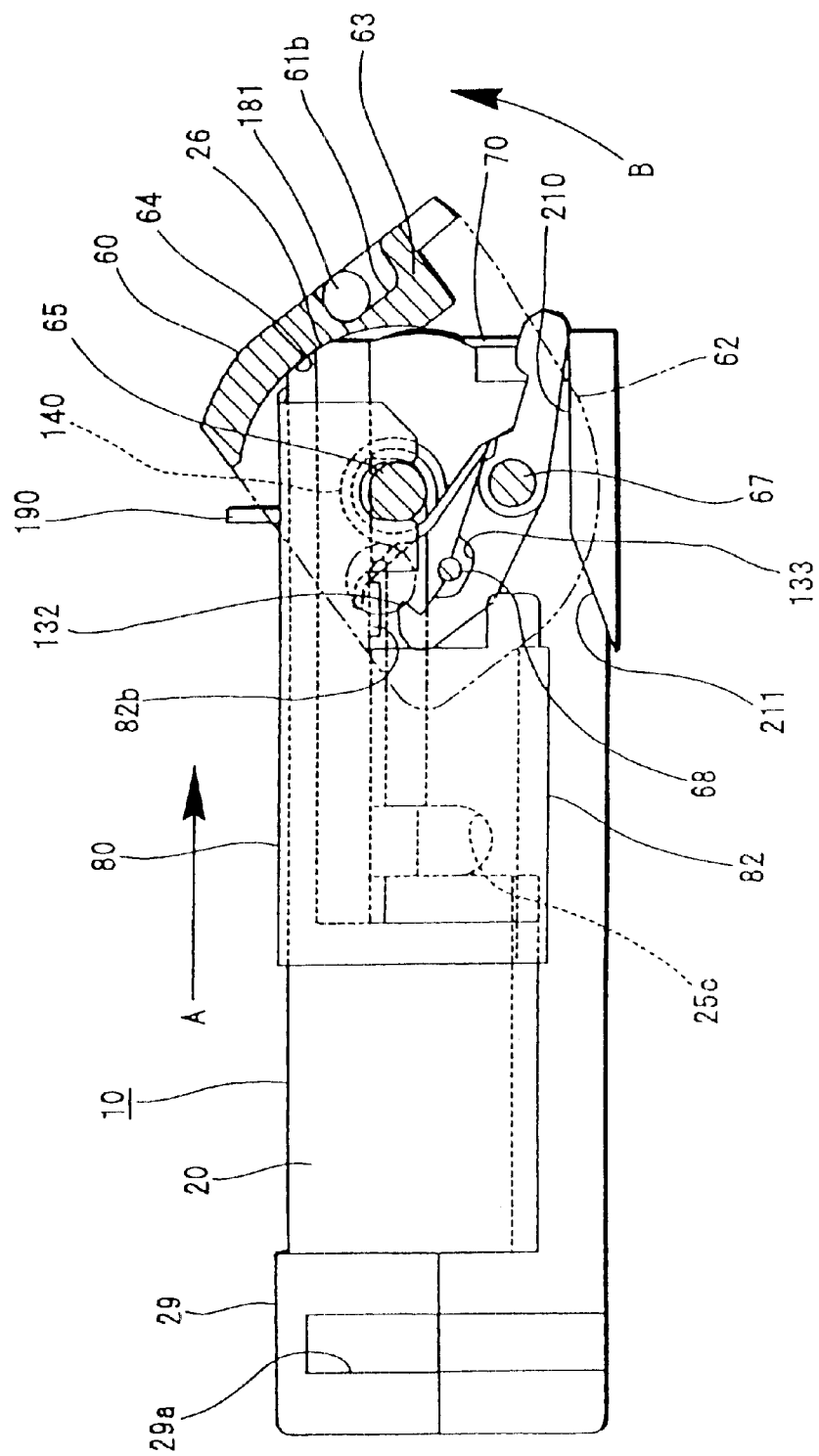
FIG. 17 is a partially-notched side view showing a state subsequent to that of FIG. 16.

When the tape cassette 10 is further inserted into the cassette holder from the above state, that is, it is moved in the direction of the arrow A in the figure, the fitting projection 181 provided to the rotational end is pressed in the direction of the arrow A, and thus the lid opener 180 is rotated in the counterclockwise direction viewed in FIG. 17, that is, in the direction of an arrow B. Accordingly, the fitting projection 181 is upwardly moved, and the front lid 60 in which the fitting projection 181 is fitted to the fitting recess portion 61b is rotated in the counterclockwise direction, that is, in the direction of the arrow B.

A force is applied to the slider 80 through the front lid 60 by the fitting projection 181 of the lid opener 180 so that the slider 80 moves backward relatively to the cassette shell 20. However, since the regulating faces 64, 64 of the front lid 60 abut against the cam portions 26, 26 of the cassette shell 20, the slider 80 cannot move backward relatively to the cassette shell 20, and only the front lid 60 is upwardly rotated. The lock pin 68 provided to the front lid 60 is fitted to the fitting recess portion 133 of the lid lock member 130 (see FIG. 17).

When the front lid 60 is rotated from the first state (the closed state shown in FIG. 14) in the direction of the arrow B by 90 degrees, the engagement between the regulating faces 64 of the front lid 60 and the cam portions 26 of the cassette shell 20 is released (see FIG. 18), and the slider 80 is allowed to be backward movable relatively to the cassette shell 20. Further, the lid lock member 130 is pressed by the lock pin 68 and thus rotates together with the front lid 60 because the fitting recess portion 133 is fitted to the lock pin 68 of the front lid 60. In the state shown in FIG. 18, the lid press projections 190, 190 supported on the support members 170*l*, 170r are set to be proximate to the upper end of the main portion 61 of the front lid 60 from the back side.

Figure 18:
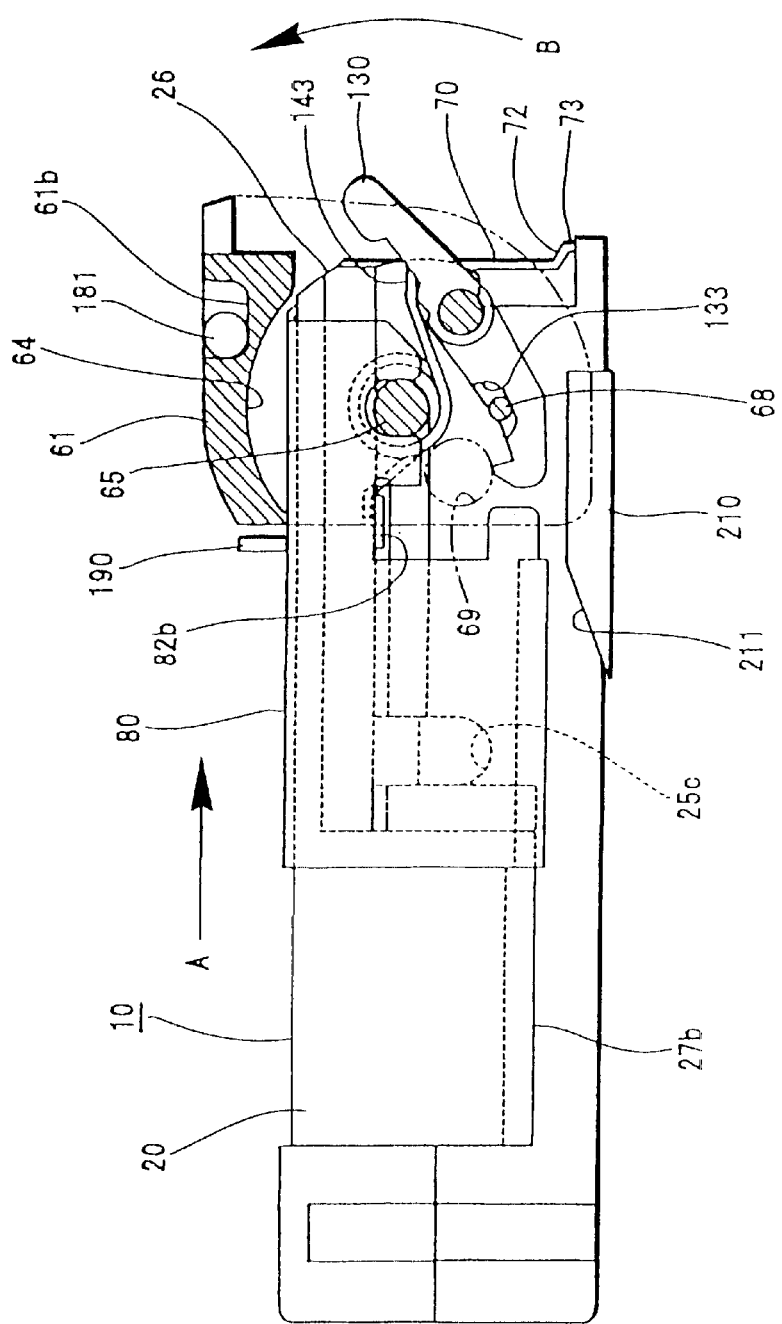
FIG. 18 is a partially-notched side view showing a state where the front lid reaches the open position.

When the tape cassette 10 is further moved to a deeper position of the cassette holder, that is, in the direction of the arrow A from the state of FIG. 18, the front lid 60 and the slider 80 on which the front lid 60 is supported cannot move in the direction of the arrow A because the fitting projection 181 of the lid opener 180 is fitted to the fitting recess portion 61b, and thus they are left at that place as they are. Therefore, the slider 80 is moved backward relatively to the cassette shell 20 together with the front lid 60. It is needless to say that the back lid 70 is backward moved relatively to the cassette shell 20. The back lid 70 is straightly backward moved and separated from the magnetic tape 30. Therefore, as compared with the prior art in which the back lid is moved in a slanting upward and backward direction by using a cam to separate it from the magnetic tape, there is less likelihood that the magnetic tape 30 is involved, and the magnetic tape 30 suffers no damage due to the involvement by the back lid 70. Further, since the back lid 70 is formed integrally with the slider 80 by the metal plate having conductivity, the back lid 70 is hardly charged, and there is no probability that the back lid 70 electrostatically involves the magnetic tape 30. Therefore, when the magnetic tape 30 is loaded to a predetermined position, there can be prevented an accident that the magnetic tape 30 runs up on a guide or the like.

Figure 19:
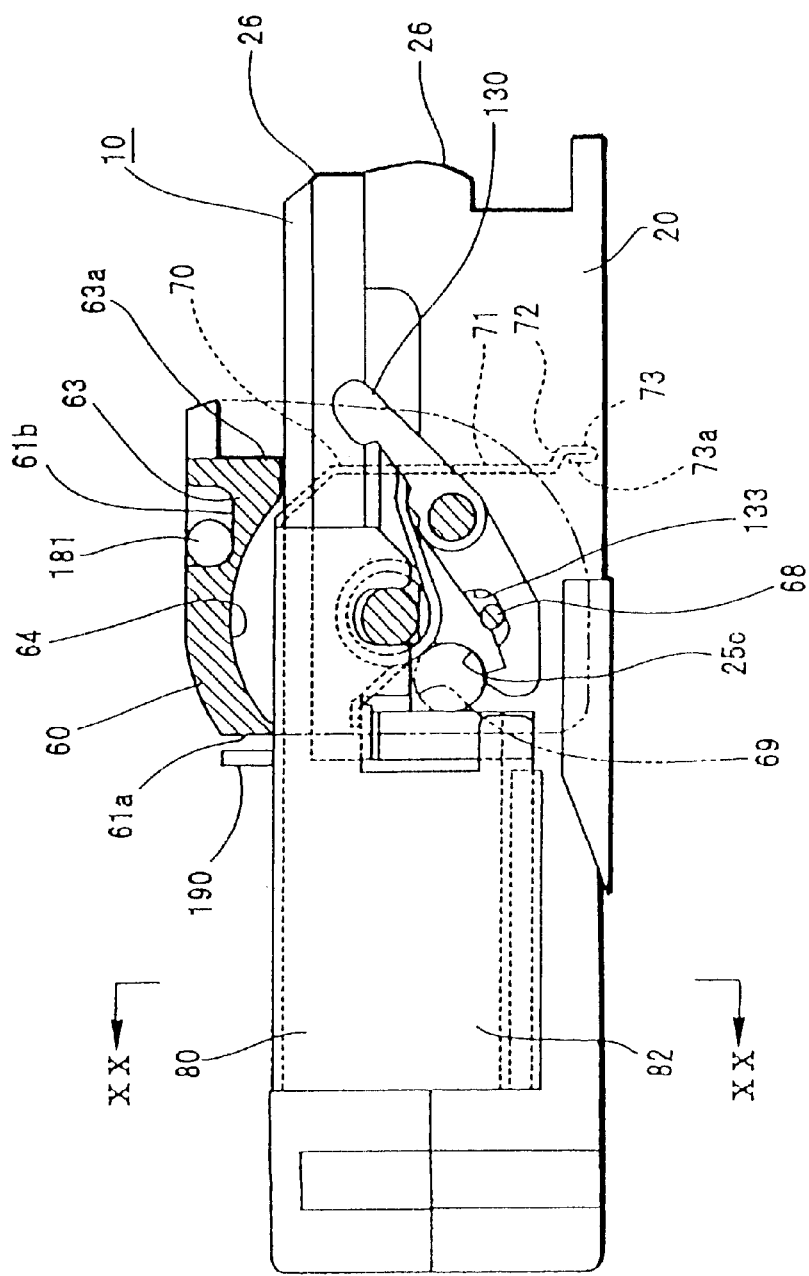
FIG. 19 is a partially-notched side view showing a state where the slider is moved back and the front lid and the back lid reach their open positions.

The insertion completion position of the tape cassette 10 in the cassette holder is defined as the position at which the respective front end faces 22b, 22c, 22d of the tape drawing portions 22 serving as the advance stoppers abut against stoppers (not shown) provided to the cassette holder (see FIG. 19).

Under the insertion completion position, the back lid 70 is backed at the deepest position of the mouth portion 21, and the ribs 71a are fitted into the recess stripes 21a formed at the back side of the mouth portion 21, whereby the depth of the mouth portion 21 can be set to be as large as possible. The slider 80 is located at the rear end of the movable region. However, since the upper surface portion 81 has a recess shape elongated in the right-and-left direction, so that the residual amount of the magnetic tape 30 can be visually checked if the upper side flanges of the tape reels 40, 50 and the upper surface portion of the cassette shell 20 are formed of transparent materials. Further, in this state, the light-transmissible holes 69 formed at the side surface portions 62 of the front lid 60 are coincident with the light-transmissible holes 25c formed on the side surfaces of the cassette shell 20. Under the non-use state, the light-transmissible holes 25c of the cassette shell 20 are closed by the side surface portions 82 of the slider 80, and foreign matter such as dust can be prevented from invading from the light-transmissible holes 25c into the cassette shell.

It is necessary to press the tape cassette 10 downwardly so that it is not floated from the cassette holder. In this case, it is better to press the tape cassette 10 downwardly through the slider 80 of metal. In this case, the back lid 70 can be prevented from being charged by forming the member for pressing the slider 80 of conductive material and bringing the member into contact with the ground member of the cassette holder.

The elastic force of the torsion coil spring 140 does not act to make the cassette shell 20 float from the cassette holder because the front lid 60 is brought into elastic contact with the upper surface of the cassette shell 20. That is, conventionally, the open state of the front lid is held by the lid opening member provided to the recording/reproducing apparatus side, so that the elastic force of the spring which urges the front lid in the lid closing direction acts on the lid opening member and the repulsive force thereof acts to make the cassette shell float from the cassette holder. However, in the tape cassette 10 described above, the elastic force of the torsion coil spring 140 merely acts to bring the front lid 60 into elastic contact with the upper surface of the cassette shell 20.

As described above, to move the front lid 60 and the back lid 70 to the lid opening position, such a sequential operation that the front lid 60 is first rotated to the lid opening position and then the slider 80 is moved backward so that the back lid 70 is moved to the lid opening position can be performed by utilizing such a structure that the cam portions 26, 26 are formed in the cassette shell 20 and the cam portions 26, 26 are fitted to the regulating faces 64, 64 of the front lid 60 while such a simple structure as the lid opener 180 serving as a rotating arm is used.

Figure 21A:
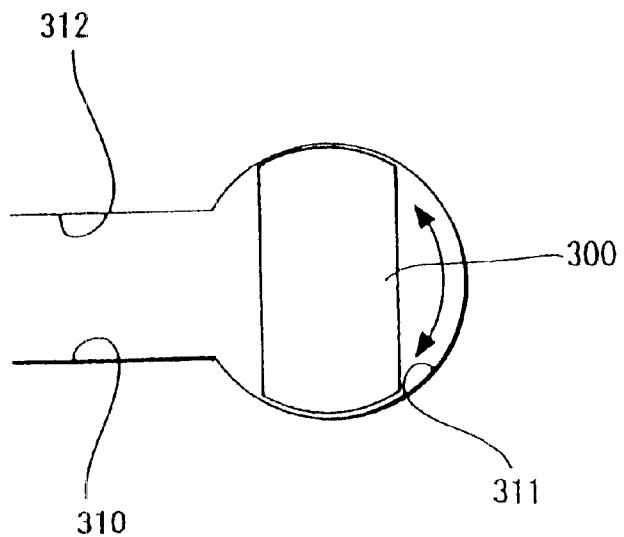
Figure 21B:
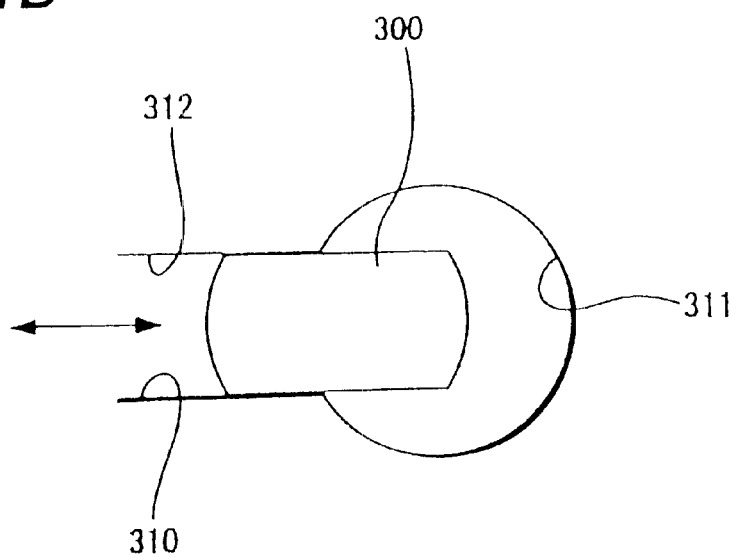

Such a sequential operation can be achieved by another structure. For example, as shown in FIGS. 21A and 21B, a control portion 300 having a substantially oval-shape is formed in the rotational fulcrum shaft of the front lid, and it is fitted to a guide portion 310 provided to the cassette shell. The guide portion 310 comprises a large-diameter portion 311 and a slide portion 312 extending backward from the large-diameter portion 311, and the control portion 300 is located in the large-diameter portion 311 of the guide portion 310 so that the longitudinal direction thereof is along the vertical direction as shown in FIG. 21A in the lid closing state. In this state, the control portion 300, that is, the front lid cannot be moved backward. When the front lid is rotated from the state of FIG. 21A by 90 degrees, the longitudinal direction of the control portion 300 is along the horizontal direction, that is, along the extending direction of the slide portion 312 of the guide portion 310. Therefore, the control portion 300 slides the slide portion 312 of the guide portion 310 so that it can move backward (see FIG. 21B), and thus the front lid can move backward.

When the tape cassette 10 is inserted to the insertion completion position described above in the cassette holder, the cassette holder moves to a predetermined position (normally descends) to load the tape cassette 10 to a predetermined mount position.

When the tape cassette 10 is mounted at the predetermined mount position, the reel tables (not shown) invade from the reel stand insertion ports 23 into the cassette shell 20 and the tape reels 40, 50 are mounted on the reel tables. In addition, the reel fitting shafts provided to the reel tables are fitted into the fitting holes of the tape reels 40, 50, and a rotational head drum 220, a drawing guide, a pinch roller (not shown), etc. are inserted into the mouth portion 21. A light emitting portion of a sensor for detecting the leading end and the trailing end of the magnetic tape 30 is inserted in the light shielding barrel 25, and a photodetecting portion of the sensor is disposed in the vicinity of the light-transmissible holes 69 (overlapped with the light-transmissible holes 25*c* of the cassette shell 20) of the front lid 60, whereby the light emitting portion and the photodetecting portion of the sensor are disposed so as to face each other through the magnetic tape 30.

The drawing guide, the pinch roller, etc. move to draw out the magnetic tape 30 from the cassette shell 20, wind the magnetic tape 30 around the rotational head drum 220 by a predetermined winding angle and also form a predetermined tape pass.

Figure 22:
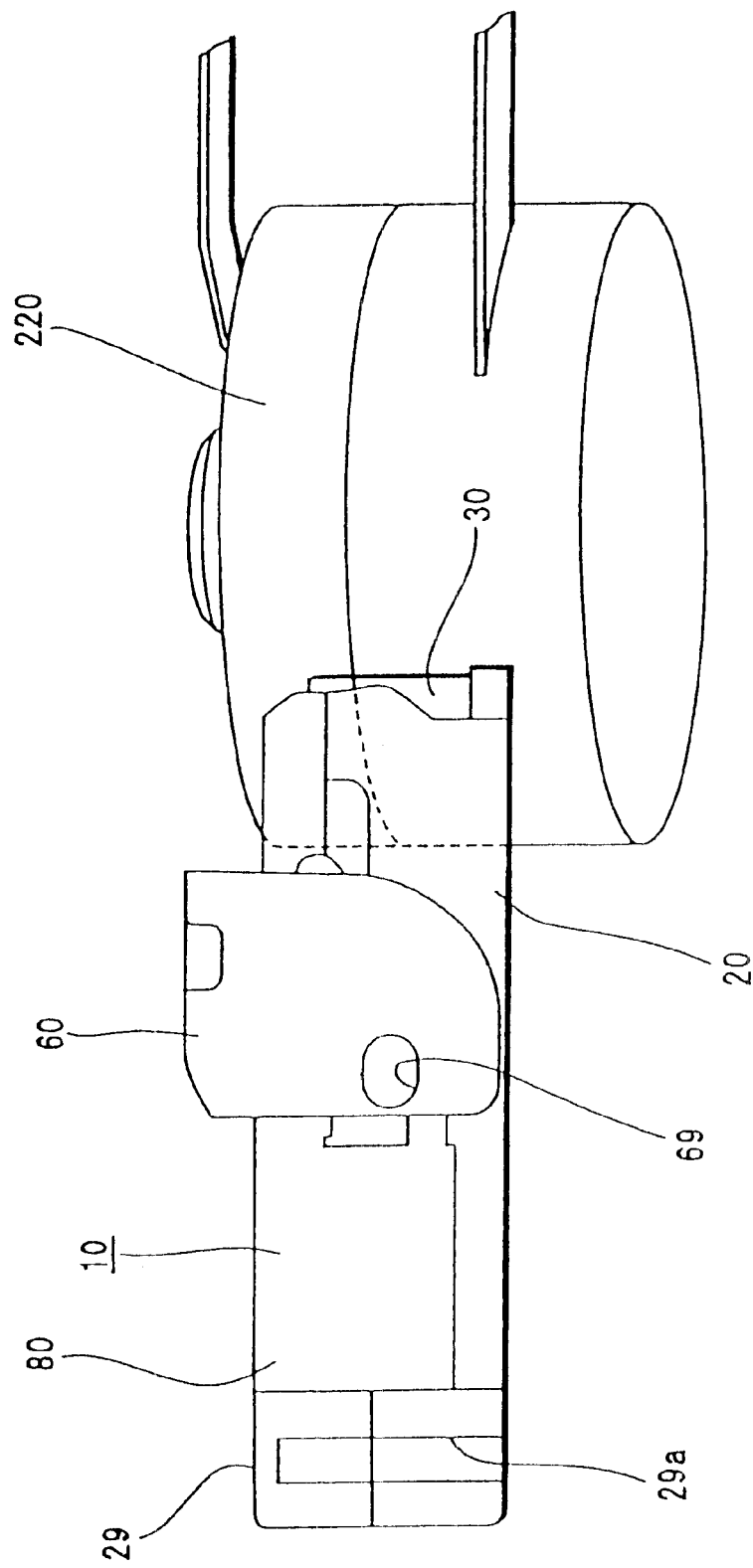
FIG. 22 is a schematic side view showing a state where the tape cassette is mounted at a predetermined mount position of a recording/reproducing apparatus.
Figure 23:
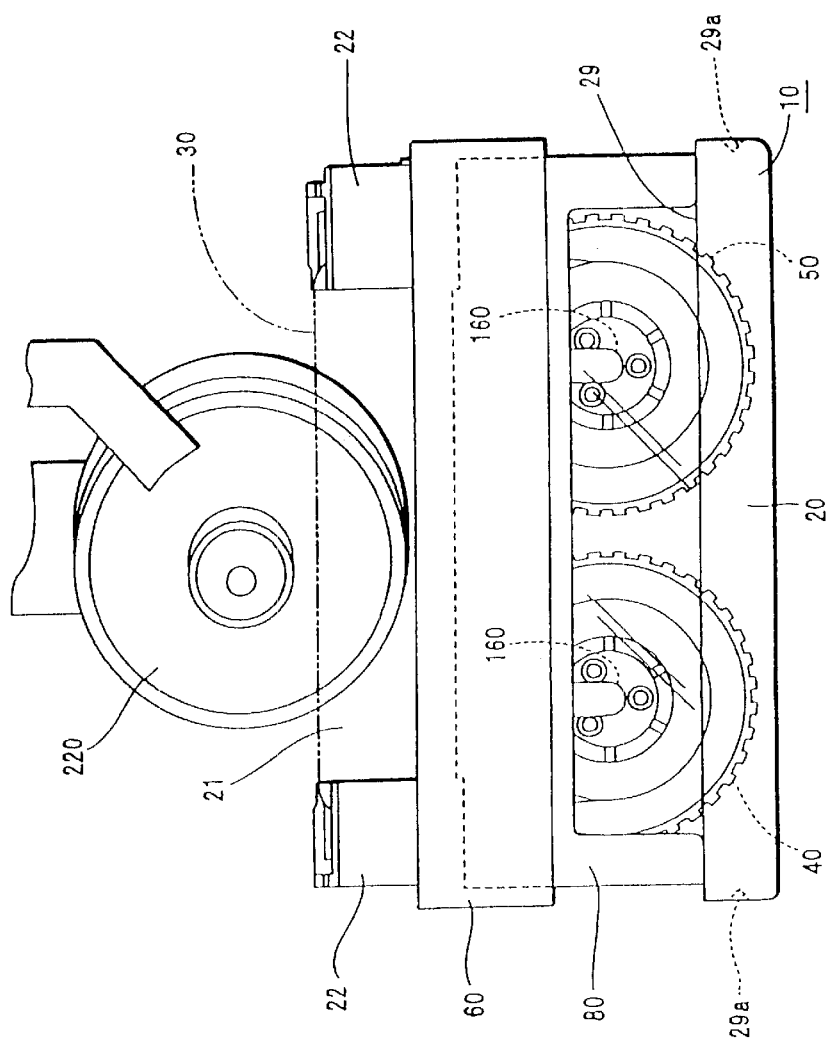
FIG. 23 is a schematic plan view showing a state where the tape cassette is mounted at a predetermined mount position of a recording/reproducing apparatus.
Figure 24:
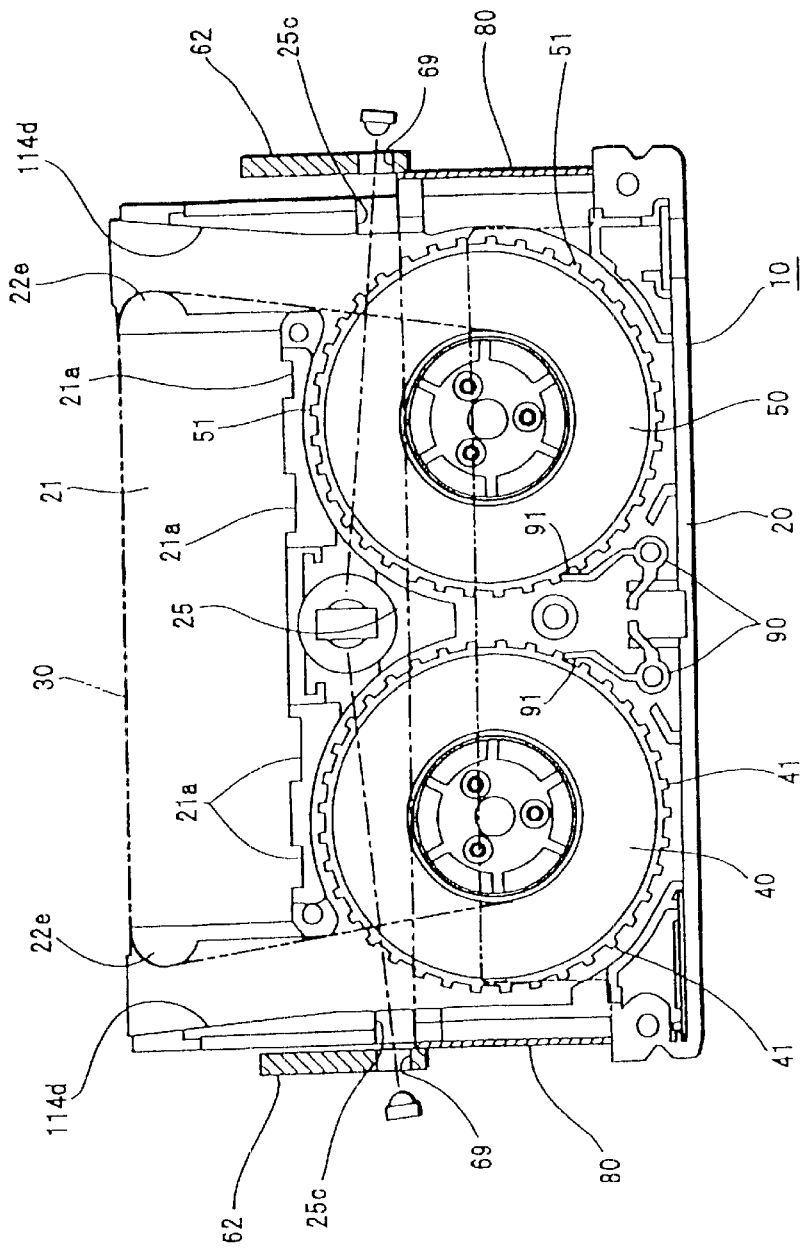
FIG. 24 is a schematic horizontal sectional-view showing a state where the tape cassette is mounted at the predetermined mount position of the recording/reproducing apparatus.

In the tape cassette 10, the upper portion of the mouth portion 21 is released unlike such a type that the front lid is merely rotated upwardly to open the lid and such a type that the back lid is accommodated at the upper side of the mouth portion when the lid is opened. Accordingly, the rotational head drum 220 can be located so as to project from the upper surface of the mouth portion 21 (see FIG. 22), and thus for example, the slant angle of the rotational head drum 220 can be increased to increase the azimuth angle of the recording track, whereby the crosstalk between recording tracks can be reduced to enhance the recording density.

When the recording or reproduction on the magnetic tape 30 is completed, the members such as the drawing guide, the pinch roller are moved into the mouth portion, and an extra magnetic tape 30 is wound around one tape reel 40.

Figure 25:
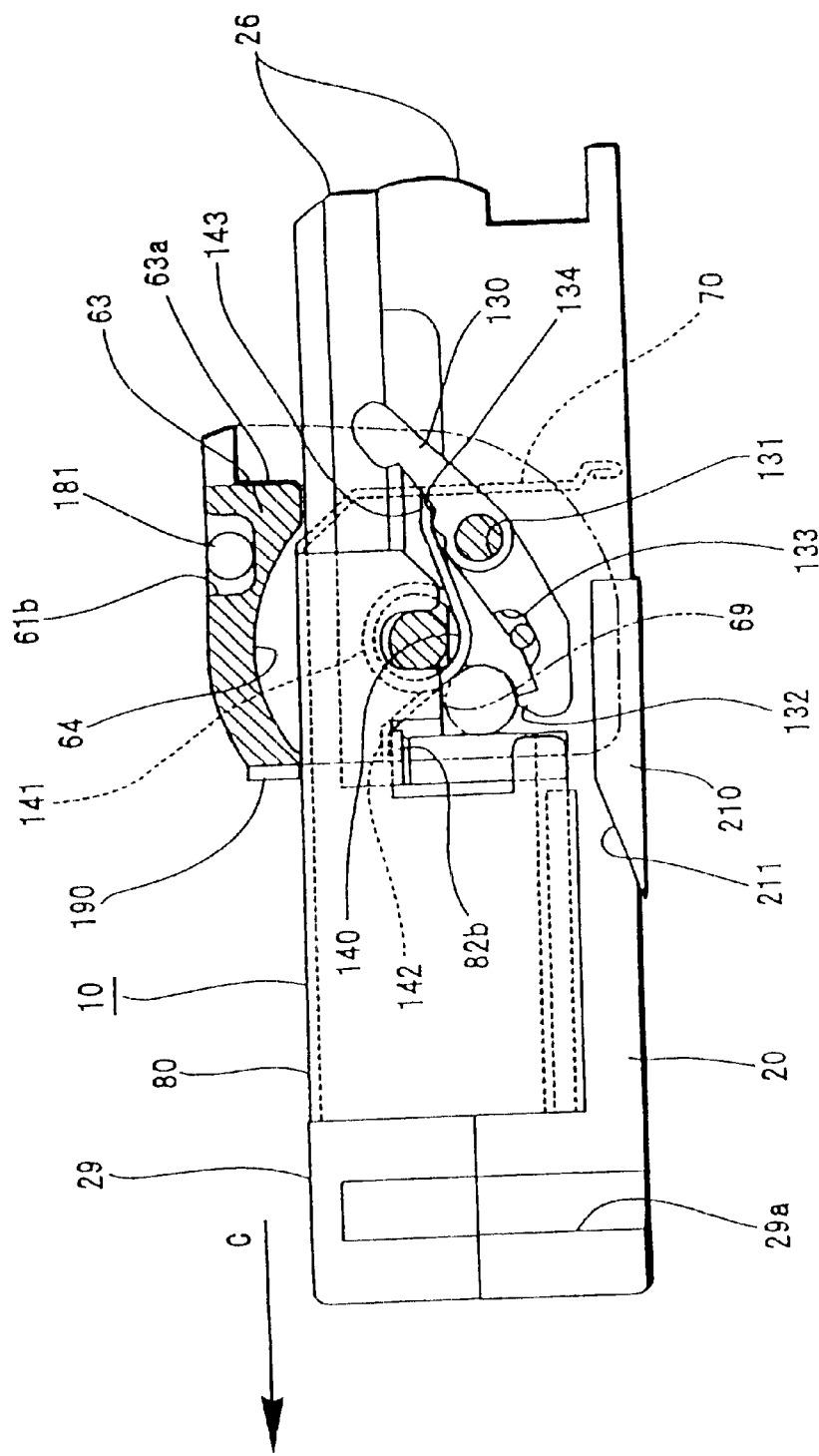
FIG. 25 is a partially-notched side view showing a state where the slider is started to be moved to the front end.

Thereafter, the cassette holder is returned to the insertion completion position, and then the tape cassette 10 is moved in the unload direction, that is, in the direction of an arrow C (see FIG. 25).

When the tape cassette 10 is moved in the direction of the arrow C, the lid press projections 190 provided to 170*l*, 170*r* relatively press both the sides of the upper end portion of the main portion 61 of the front lid 60 in the direction opposite to the direction of the arrow C, whereby the front lid 60 and the slider 80 (together with the back lid 70) are moved toward the front end of the cassette shell 20.

Figure 26:
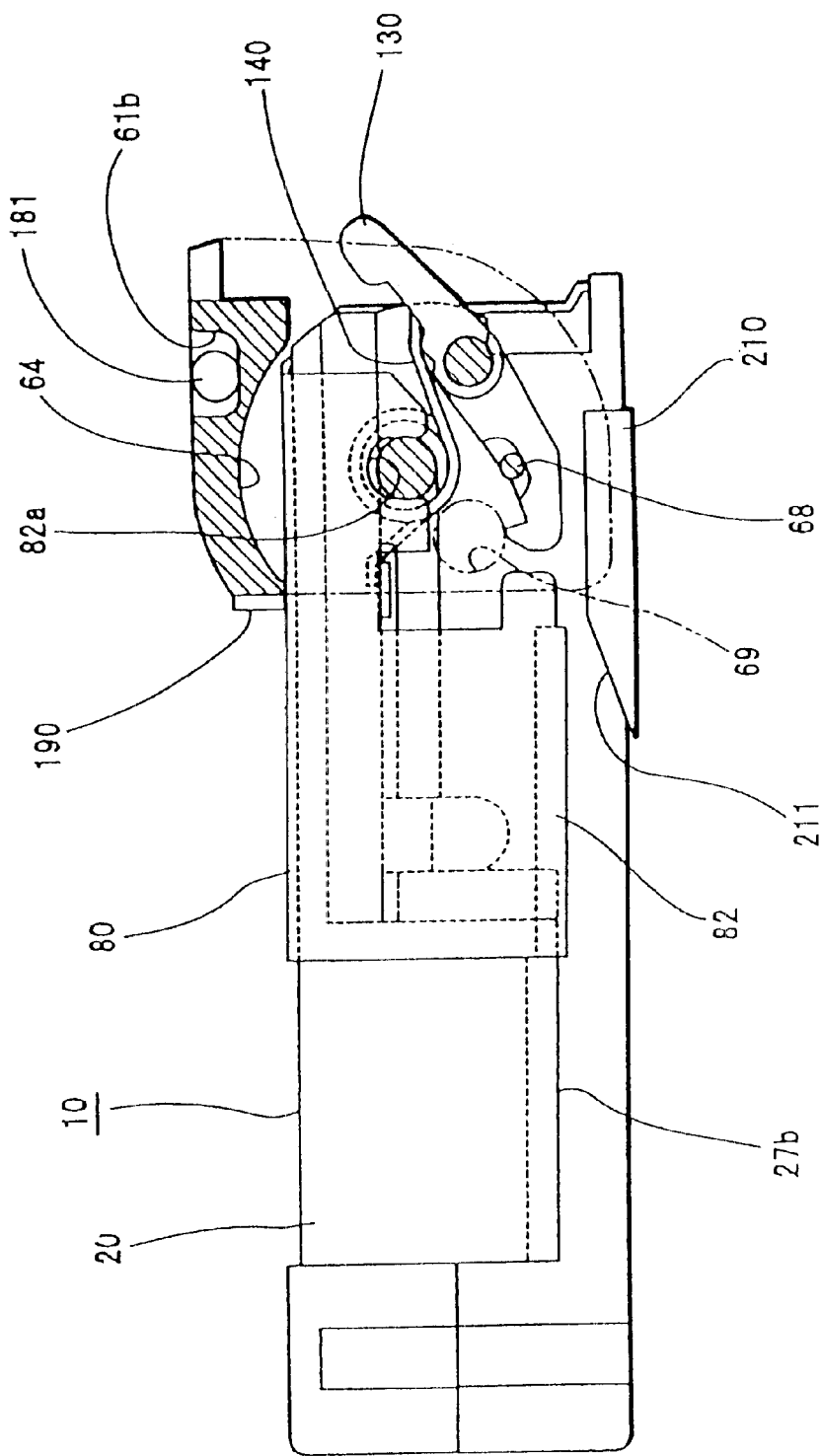
FIG. 26 is a partially-notched side view showing a state where the slider reaches the front end of a movable region.

When the slider 80 covers the front end of the movable region (see FIG. 26), the lower end portions 63*a* of the thick portions 63 of the front lid 60 are detached from the upper surface of the cassette shell 20, so that the front lid 60 is set to be downwardly rotatable. By the urging force of the torsion coil spring 140 applied through the lid lock member 130 and the lock pin 68, the front lid 60 is downwardly rotated, reaches the lid closing position and covers the magnetic tape 30 in cooperation with the back lid 70 advanced. The hook pawl 132 of the lid lock member 130 is hooked to the upper surface of the slide projection 82*b* of the slider 80, and the front lid 60 is further rotated from the above position in the lid closing direction, whereby the lock pin 68 is separated from the fitting recess portion 132 of the lid lock member 130. The tape cassette 10 is taken out of the cassette holder (not shown).

Each projection 29 formed at the rear end portion of the cassette shell 20 is projected in the lateral direction so as to be located at the outside of the side surface of the slider 80, and it serves as a portion to be grasped by an automatic changer when the automatic changer of the tape cassette is used.

As is apparent from the foregoing description, according to the present invention, the tape cassette which includes the mouth portion opened in the forward direction and in the up-and-down direction and provided at the front portion of the cassette shell containing the tape reels around which the tape-shaped recording medium is wound, and in which a part of the tape-shaped recording medium is located so as to traverse the front end of the mouth portion and the tape-shaped recording medium is covered by the front lid located at the front side thereof and the back lid located at the back-side thereof, is characterized in that the back lid is provided so as to be freely movable forward and backward relatively to the cassette shell, and the back lid is moved back to the just back side thereof when the lid is opened to expose the tape-shaped recording medium to the outside.

Accordingly, according to the tape cassette of the present invention, since the back lid is moved back from the tape-shaped recording medium at a stretch, so that the tape-shaped recording medium can be prevented from being entangled by the back lid when the lid is opened.

Further, according to the present invention, the cassette shell is provided with the slider which is freely movable in the forward and backward direction, and the back lid is supported on the slider. Therefore, the lid open structure of the back lid is extremely simple, and thus occurrence of troubles and damages can be suppressed.

Still further, according to the present invention, the back lid is formed integrally with the slider, and thus the support structure of the back lid to the slider is extremely simple, so that occurrence of troubles and damages can be more suppressed.

What is claimed is:

1. A tape cassette comprising:

tape reels around which a tape-shaped recording medium is wound;

a cassette shell in which said tape reels are accommodated;

a mouth portion provided at a front portion of said cassette shell so as to be opened in a forward direction and in an up-and-down direction, a part of said tape-shaped recording medium being located so as to traverse a front end of said mouth portion;

a front lid located at a front side of the tape-shaped recording medium;

a back lid which is located at a back side of the tape-shaped recording medium to cover the tape-shaped recording medium;

a slider that is freely movable forward and backward, wherein the front lid is freely rotatably mounted at the front end portion of the slider and wherein the back lid is formed integrally with the slider; and lock means for preventing rotation of said front lid until said slider is forwardly moved to a front end and the back side of the tape-shaped recording medium is covered by said back lid, wherein said front lid is rotated from a lid open position to a lid close position after said back lid is moved to a lid close position.

2. The tape cassette as claimed in claim 1, wherein said slider is provided a slide fitting portion which is fitted to a side-surface projection provided to an upper shell of said cassette shell so that said slider is slid, said slide fitting portion of said slider and said side-surface projection of said upper shell have a pair of fitting portions and a pair of projections, and said pair of fitting portions and said pair of projections are fitted to each other to be slid.

3. The tape cassette as claimed in claim 2, wherein said pair of fitting portions/projections comprise first fitting portions/projections and second fitting portions/projections being smaller than the first fitting portions/projections.

4. The tape cassette as claimed in claim 3, wherein said pair of fitting portions/projections have bent tips.

5. The tape cassette as claimed in claim 4, wherein said pair of fitting portions are disposed away from each other in a slide direction.

6. A tape cassette comprising:

tape reels around which a tape-shaped recording medium is wound;

a cassette shell in which said tape reels are accommodated;

a mouth portion provided at a front portion of said cassette shell so as to be opened in a forward direction and in an up-and-down direction, a part of said tape-shaped recording medium being located so as to traverse a front end of said mouth portion;

a front lid located at a front side of the tape-shaped recording medium;

a back lid which is located at a back side of the tape-shaped recording medium to cover the tape-shaped recording medium and provided to said cassette shell so as to be freely movable in the forward and backward direction, said back lid being moved back to the just back side thereof when a lid-open operation is carried out to expose the tape-shaped recording medium to the outside; and a slider provided to said cassette shell so as to be freely movable in the forward and backward direction, said back lid being supported on said slider, wherein said back lid is formed integrally with said slider, said slider is provided a slide fitting portion which is fitted to a side-surface projection provided to an upper shell of said cassette shell so that said slider is slid, said slide fitting portion of said slider and said side-surface projection of said upper shell have a pair of fitting portions and a pair of projections, said pair of fitting portions and said pair of projections are fitted to each other to be slid, said pair of fitting portions/projections comprise large and small fitting portions/projections, said pair of fitting portions/projections have bent tips, and said pair of fitting portions are designed so that one fitting portion fitted to said upper shell is smaller than an other fitting portion, wherein said other fitting portion is fitted to a lower shell of said cassette shell.

* * * * *